(12) United States Patent
Nakamura et al.

(10) Patent No.: US 10,165,236 B2
(45) Date of Patent: Dec. 25, 2018

(54) HEAT EXCHANGE DEVICE, COOLING DEVICE, AND PROJECTOR

(71) Applicant: Seiko Epson Corporation, Tokyo (JP)

(72) Inventors: Kentaro Nakamura, Shiojiri (JP); Kaname Nagatani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 293 days.

(21) Appl. No.: 15/093,629

(22) Filed: Apr. 7, 2016

(65) Prior Publication Data

US 2016/0301902 A1 Oct. 13, 2016

(30) Foreign Application Priority Data

Apr. 8, 2015 (JP) ................................. 2015-079499

(51) Int. Cl.

| | |
|---|---|
| *G03B 21/16* | (2006.01) |
| *H04N 9/31* | (2006.01) |
| *F25B 21/02* | (2006.01) |
| *F28D 9/00* | (2006.01) |
| *F28D 15/00* | (2006.01) |
| *F28F 3/02* | (2006.01) |
| *F28F 3/04* | (2006.01) |
| *F28D 21/00* | (2006.01) |

(52) U.S. Cl.
CPC .......... *H04N 9/3144* (2013.01); *F25B 21/02* (2013.01); *F28D 9/0037* (2013.01); *F28D 9/0093* (2013.01); *F28D 15/00* (2013.01); *F28F 3/02* (2013.01); *G03B 21/16* (2013.01); *F28D 2021/0028* (2013.01); *F28F 3/048* (2013.01)

(58) Field of Classification Search
CPC ........ F28B 21/02; F28D 15/00; F28D 9/0037; F28D 9/0093; F28D 2021/0028; F28D 3/048; F28F 3/02; H04N 9/3144; G03B 21/16

See application file for complete search history.

(56) References Cited

U.S. PATENT DOCUMENTS

2005/0168703 A1 * 8/2005 Fujimori .............. H04N 9/3144
353/52
2010/0253923 A1 10/2010 Yanagisawa et al.

FOREIGN PATENT DOCUMENTS

| JP | 2004-194401 A | 7/2004 |
|---|---|---|
| JP | 2006-343498 A | 12/2006 |
| JP | 2010-243694 A | 10/2010 |

* cited by examiner

*Primary Examiner* — Sultan Chowdhury
*Assistant Examiner* — Magda Cruz
(74) *Attorney, Agent, or Firm* — ALG Intellectual Property, LLC

(57) ABSTRACT

A heat exchange device includes an inner member through which a first liquid circulates, and a pair of outer members through which a second liquid circulates, the inner member is provided with an inner housing through which the first liquid circulates, and a pair of first plate-like members attached to the inner housing so as to be opposed to each other, each of the pair of outer members is provided with an outer housing through which the second liquid circulates, and a second plate-like member attached to the outer housing, and the pair of outer members are disposed on both sides of the inner member so that one of the pair of first plate-like members is opposed to one of the second plate-like members of the pair of outer members, and the other of the pair of first plate-like members is opposed to the other of the second plate-like members.

21 Claims, 19 Drawing Sheets

HEAT EXCHANGE DEVICE, COOLING DEVICE, AND PROJECTOR

BACKGROUND

1. Technical Field

The present invention relates to a heat exchange device, a cooling device, and a projector.

2. Related Art

In the past, there has been known a projector provided with a light source, a light modulation device for modulating the light emitted from the light source to thereby form an image corresponding to image information, and a projection optical device for projecting the image thus formed on a target projection surface such as a screen in an enlarged manner.

Incidentally, in such a projector, a liquid crystal panel is adopted as the light modulation device in some cases, and the liquid crystal panel has a problem that the deterioration of the liquid crystal panel progresses unless the liquid crystal panel is appropriately cooled.

In contrast, there has been known a projector equipped with a cooling device for circulating a cooling liquid in the liquid crystal panel to thereby cool the liquid crystal panel (see, e.g., JP-A-2010-243694 (Document 1)).

In the projector described in Document 1, the cooling device is for circulating the cooling liquid along a flow channel having a ring-like shape to cool the liquid crystal panel with the cooling liquid, and is provided with an optical element holding section for holding a liquid crystal panel, a liquid pressure-feeding section, a tank, a heat exchange unit, and a plurality of liquid circulation members for connecting the optical element holding section, the liquid pressure-feeding section, the tank, and the heat exchange unit to each other to form a circulation flow channel.

The heat exchange unit has a heat exchanger, a zoning plate, a Peltier element, and a heat-radiation side heat-transfer member.

The heat exchanger is for performing heat exchange with the cooling liquid circulating inside the heat exchanger, and inside the heat exchanger, there is formed a plurality of fine flow channels. The zoning plate zones the heat exchanger and the heat-radiation side heat-transfer member, and at the same time, integrates the heat exchanger, the Peltier element, and the heat-radiation side heat-transfer member with each other. The Peltier element is fitted into the zoning plate, wherein the heat absorption surface of the Peltier element is connected to the heat exchanger, and the heat release surface is connected to the heat-radiation side heat-transfer member. The heat-radiation side heat-transfer member is formed of a so-called heatsink, and radiates the heat of the cooling liquid having been propagated via the Peltier element.

Incidentally, it is possible to cool a cooling object not by directly cooling the cooling object with the cooling liquid, but by feeding the air cooled by the cooling liquid to the cooling object. In such a configuration, it is possible to adopt a configuration in which the heat absorbed from the air is propagated to the cooling liquid, then the heat is further propagated from the cooling liquid to another cooling liquid, and then the heat having been propagated to the another cooling liquid is radiated at a position distant from the cooling object.

If it is attempted to adopt the configuration of the heat exchanger provided to the liquid cooling device described in Document 1 described above as such a configuration of propagating the heat between the cooling liquids, it is possible to connect two heat exchangers to each other so as to be able to propagate the heat to each other, then circulate the cooling liquid described above in one of the heat exchangers, and circulate the another cooling liquid described above in the other of the heat exchangers.

However, in such a configuration, the area of a surface, on which the one of the heat exchangers and the other of the heat exchangers are opposed to each other, becomes the maximum heat conduction area, and therefore, there is a problem that the heat of the cooling liquid circulating on the opposite side of the one of the heat exchangers to the other of the heat exchangers is difficult to be conducted to the other of the heat exchangers.

SUMMARY

An advantage of some aspects of the invention is to provide a heat exchange device, a cooling device, and a projector each capable of efficiently achieving the heat conduction from one liquid to another liquid both circulating inside the heat exchange device, the cooling device, or the projector.

A heat exchange device according to a first aspect of the invention includes an inner member through which a first liquid circulates, and a pair of outer members through which a second liquid different from the first liquid circulates, the inner member is provided with an inner housing through which the first liquid circulates, and a pair of first plate-like members attached to the inner housing so as to be opposed to each other, each of the pair of outer members is provided with an outer housing through which the second liquid circulates, and a second plate-like member attached to the outer housing, and the pair of outer members are disposed at positions across the inner member from each other so that one of the pair of first plate-like members is opposed to one of the second plate-like members of the pair of outer members, and the other of the pair of first plate-like members is opposed to the other of the second plate-like members.

According to the first aspect of the invention, one of the second plate-like members respectively provided to the two outer members sandwiching the inner member is disposed so as to be opposed to one of the pair of first plate-like members attached to the inner housing of the inner member, and the other of the second plate-like members is disposed so as to be opposed to the other of the pair of first plate-like members. According to this configuration, the heat having been conducted from the first liquid circulating in the inner member can be conducted to the corresponding one of the second plate-like member via one of the pair of first plate-like members, and then the heat can be conducted to corresponding one of the second plate-like member via the other of the pair of first plate-like members. Thus, the heat having been conducted to each of the second plate-like members can be conducted to the second liquid circulating through the outer housing. Therefore, since the heat conduction area from the inner member to the outer member can be enlarged, the heat of the first liquid circulating through the inner housing can efficiently be conducted to the second liquid circulating through the outer housing.

Further, since the inner member is sandwiched by the outer members through which the second liquid relatively high in temperature circulates, the dew condensation can be inhibited from occurring in the heat exchange device.

In the first aspect of the invention, it is preferable that each of the pair of first plate-like members is provided with a heat receiving member disposed in the inner housing, and adapted to receive heat from the first liquid, each of the second plate-like members is provided with a heat release member disposed in the outer housing, and adapted to release conducted heat to the second liquid, the one of the pair of first plate-like members and the one of the second plate-like members are connected to each other so as to be able to conduct the heat, and the other of the pair of first plate-like members and the other of the second plate-like members are connected to each other so as to be able to conduct the heat.

It should be noted that the case in which the first plate-like member and the second plate-like member are connected to each other so as to be able to conduct the heat includes the case in which the first plate-like member and the second plate-like member are connected to each other via the heat-conductive member in addition to the case in which the first plate-like member and the second plate-like member are directly connected to each other.

According to the first aspect of the invention, since each of the first plate-like members is provided with the heat receiving member disposed inside the inner housing and receiving the heat from the first liquid, the heat can efficiently be conducted from the first liquid to the first plate-like members. Further, among the first plate-like members, one of the first plate-like members is connected to one of the second plate-like members so as to be able to conduct the heat, and the other of the first plate-like members is connected to the other of the second plate-like members so as to be able to conduct the heat. Therefore, the heat having been conducted to the first plate-like member can efficiently be conducted to the corresponding one of the second plate-like members. Therefore, the first liquid can efficiently be cooled.

In the first aspect of the invention, it is preferable that the inner housing has a division wall adapted to divide an inner space of the inner housing into a first space as a space of one of the pair of first plate-like members, and a second space of the other of the pair of first plate-like members, and the first liquid having circulated in the first space is made to flow into the second space.

According to the first aspect of the invention with this configuration, since the space in the inner housing through which the first liquid circulates is divided by the division wall into the first space and the second space, the heat received from the first liquid circulating in the first space can be conducted to corresponding one of the outer members, and further, the heat received from the first liquid circulating in the second space can be conducted to corresponding one of the outer members. According to this configuration, it is possible to provide a temperature difference between the heat conducted from the first space side and the heat conducted from the second space side. Therefore, by providing a difference in temperature between the second liquid circulating through one of the two outer members and the second liquid circulating through the other of the two outer members, the difference in temperature between the first plate-like member and the second plate-like member corresponding to each other can be decreased. Therefore, in the case of, for example, conducting the heat from the first plate-like member to the second plate-like member using a thermoelectric conversion element such as a Peltier element, the heat can efficiently be conducted.

Further, for example, by dropping the temperature of the second liquid circulating through the outer member, which rises in temperature due to the heat conducted to the outer member, the outer member can effectively be cooled, and furthermore, the first liquid can effectively be cooled.

In the first aspect of the invention, it is preferable that the division wall has a communication opening adapted to communicate the first space and the second space with each other.

According to the first aspect of the invention with this configuration, since the first space and the second space are communicated with each other with the communication opening, there is no need to introduce the first liquid having flowed out from the first space to the second space with a pipe or the like. Therefore, it is possible to simplify the configuration of the inner member, and further, the configuration of the heat exchange device.

In the first aspect of the invention, it is preferable that the division wall is formed along a vertical direction, and the communication opening is located in a vicinity of an end portion on an upper side in the vertical direction in the division wall.

According to the first aspect of the invention with this configuration, by making the first liquid circulate from the lower side in the vertical direction in the division wall, it is possible to fill the first space with the first liquid, and then guide the first liquid to the second space. Therefore, the heat can surely be received from the first liquid in the first space, and the heat of the first liquid can surely be conducted to the second liquid via corresponding one of the outer member.

In the first aspect of the invention, it is preferable that among the pair of first plate-like members, the first plate-like member located on the first space side is connected to the second plate-like member of the outer member located on a downstream side in a flow channel of the second liquid out of the two outer members so as to be able to conduct the heat, and the first plate-like member located on the second space side is connected to the second plate-like member of the outer member located on an upstream side in the flow channel of the second liquid out of the two outer members so as to be able to conduct the heat.

According to the first aspect of the invention with this configuration, since the second liquid to which the heat of the first liquid is not yet conducted circulates in the outer member located on the upstream side in the flow channel of the second liquid, the temperature of the second liquid is relatively low. In contrast, since the first liquid, the heat of which has been received in the first space, circulates in the second space, the temperature of the first liquid is relatively low.

On the other hand, since the second liquid, to which the heat has been conducted in the outer member located on the upstream side in the flow channel of the second liquid, circulates in the outer member located on the downstream side, the temperature of the second liquid is relatively high. In contrast, since the first liquid, the heat of which has not been received yet, circulates in the first space, the temperature of the first liquid is relatively high.

Since the difference in temperature between the first plate-like member and the second plate-like member corresponding to each other can be decreased, in the case of conducting the heat from the first plate-like member to the second plate-like member using the thermoelectric conversion element such as a Peltier element, the heat can efficiently be conducted.

In the first aspect of the invention, it is preferable that the inner housing is provided with an inner-housing-side inlet through which the first liquid flows into the inner housing, and an inner-housing-side outlet through which the first liquid located inside the inner housing flows to an outside, and the inner-housing-side inlet and the inner-housing-side outlet are located in a surface on the same side of the inner housing.

According to the first aspect of the invention with this configuration, the total dimension of the inner member can be reduced compared to the case in which the inner-housing-side inlet and the inner-housing-side outlet are located in the surfaces different from each other. Therefore, it is possible to miniaturize the inner member, and furthermore, the heat exchange device.

In the first aspect of the invention, it is preferable that the inner-housing-side inlet is located on a lower side in a vertical direction, and the inner-housing-side outlet is located on an upper side in the vertical direction.

Here, in the case in which the inner-housing-side inlet is located on the upper side in the vertical direction, and the inner-housing-side outlet is located on the lower side in the vertical direction, there is a possibility that the first liquid flows out from the inner-housing-side outlet without filling the space in the inner housing with the first liquid. In such a case, there is a possibility that the heat cannot sufficiently be received from the first liquid.

In contrast, since the inner-housing-side inlet is located on the lower side in the vertical direction, the inner-housing-side outlet is located on the upper side in the vertical direction, the space in the inner housing can be filled with the first liquid, and thus, the heat can surely be received from the first liquid in the space. Therefore, the heat conduction from the first liquid to the second liquid can surely be performed.

In the first aspect of the invention, it is preferable that each of the outer housings is provided with an outer-housing-side inlet through which the second liquid flows into the outer housing, and an outer-housing-side outlet through which the second liquid located inside the outer housing flows to an outside, and the outer-housing-side outlet provided to the one of the two outer members and the outer-housing-side inlet provided to the other of the two outer members are connected to each other so that the second liquid can circulate.

According to the first aspect of the invention with this configuration, since the outer-housing-side outlet of the one of the outer members and the outer-housing-side inlet of the other of the outer members are connected to each other, there is no need to individually circulate the second liquid to each of the outer members. Therefore, there is no need to use the configuration (e.g., a manifold) for guiding the second liquid to each of the outer members by branching the flow channel of the second liquid. Therefore, the piping for guiding the second liquid to the outer members can easily be achieved, and further, the configuration of the heat exchange device can be simplified.

In the first aspect of the invention, it is preferable that the outer-housing-side outlet provided to the one of the outer members and the outer-housing-side inlet provided to the other of the outer members are located in surfaces facing to the same side, the outer-housing-side inlet provided to the one of the outer members and the outer-housing-side outlet provided to the other of the outer members are located in surfaces facing to the same side, the outer-housing-side inlet provided to each of the two outer members is located on a lower side in a vertical direction, and the outer-housing-side outlet provided to each of the two outer members is located on an upper side in the vertical direction.

According to the first aspect of the invention with this configuration, if the outer-housing-side outlet and the outer-housing-side inlet to be connected to each other so that the second liquid can circulate are located in the same surface, the connection of the outer-housing-side outlet and the outer-housing-side inlet can easily be achieved. Further, if the other outer-housing-side inlet and the other outer-housing-side outlet are located in the same surface, the connection of the inlet and the outlet to the circulation flow channel of the second liquid can easily be achieved. Therefore, the piping to the outer members can easily be achieved.

Further, by locating the outer-housing-side inlets on the lower side in the vertical direction, and locating the outer-housing-side outlets on the upper side in the vertical direction, it is possible to fill the space in the outer housing with the second liquid similarly to the case of the inner-housing-side inlet and the inner-housing-side outlet described above. Therefore, since the heat conducted from the inner member can surely be released to the second liquid in the space, the heat having been received from the first liquid can surely be conducted to the second liquid.

In the first aspect of the invention, it is preferable that a thermoelectric conversion element is disposed in at least one of a position between the one of the first plate-like members and the one of the second plate-like members and a position between the other of the first plate-like members and the other of the second plate-like members, wherein a heat absorbing side of the thermoelectric conversion element faces to the first plate-like member, and a heat release side of the thermoelectric conversion element faces to the second plate-like member.

According to the first aspect of the invention with this configuration, since the heat of the first liquid having been conducted to the first plate-like member can efficiently be conducted to corresponding one of the second plate-like member, the heat of the first liquid can efficiently be conducted to the second liquid via the second plate-like member.

Further, as described above, since the heat conduction efficiency by the thermoelectric conversion element can be enhanced in the case in which the difference in temperature between the first plate-like member and the second plate-like member sandwiching the thermoelectric conversion element is small, the heat conduction from the first liquid to the second liquid can more efficiently be achieved.

A cooling device according to a second aspect of the invention includes the heat exchange device, a heat absorbing device adapted to absorb heat generated in a cooling object to conduct the heat to the first liquid, and a heat radiation device adapted to radiate heat of the second liquid to which the heat is conducted from the first liquid in the heat exchange device.

According to the second aspect of the invention, substantially the same advantages as those of the heat exchange device according to the first aspect of the invention can be exerted. Further, since the first liquid having circulated in the heat absorbing device, and the second liquid the heat of which is radiated by the heat radiation device circulate in the heat exchange device, due to the heat exchange device capable of efficiently conducting the heat from the first liquid to the second liquid, the cooling object can effectively be cooled.

In the second aspect of the invention, it is preferable that the heat absorbing device includes a heat absorber adapted to absorb the heat of the cooling object and then conduct the heat to the first liquid circulating through the heat absorber, and a first liquid pressure-feed section adapted to pressure-feed the first liquid, and the heat radiation device includes a second liquid pressure-feed section adapted to pressure-feed the second liquid, and a heat radiator adapted to radiate the heat conducted from the second liquid circulating through the heat radiator.

According to the second aspect of the invention with this configuration, the heat absorbing device is provided with the heat absorber for absorbing the heat of the cooling object, and then conducting the heat to the first liquid, and the first liquid pressure-feed section adapted to pressure-feed the first liquid, and can therefore effectively cool the cooling object due to the heat exchange device described above receiving the heat of the first liquid to thereby cool the first liquid. Further, the second liquid is pressure-fed by the second liquid pressure-feed section, and the heat radiator of the heat radiation device radiates the heat of the second liquid conducted from the first liquid using the heat exchange device, and thus, the second liquid can efficiently be cooled. Therefore, the heat of the cooling objects can effectively be cooled via the first liquid and the second liquid.

A projector according to a third aspect of the invention includes the cooling device described above.

According to the third aspect of the invention, substantially the same advantages as those of the cooling device according to the second aspect of the invention can be exerted.

In the third aspect of the invention, it is preferable that there are included a light source, a light modulation device adapted to modulate light emitted from the light source to form an image, an optical component making a contribution to the formation of the image by the light modulation device, and a circulatory cooling device having a sealed housing incorporating the cooling object, and adapted to circulate a gas in the sealed housing to cool the cooling object, and the cooling object is at least either of the light source, the light modulation device, and the optical component.

According to the third aspect of the invention with this configuration, since the cooling object is cooled by the circulatory cooling device for circulating the gas in the sealed housing, and the heat of the gas is absorbed by the heat absorber described above, the rise in temperature in the sealed housing can be suppressed, and the cooling object can effectively be cooled. Further, since the cooling object is either of the light source, the light modulation device, and the optical component, and the cooling object can effectively be cooled, the image projection can stably be performed, and further, the deterioration of the cooling object and the deterioration of the projection image can be suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will hereinafter be described with reference to the accompanying drawings.
Appearance Configuration of Projector FIG. 1 is a schematic perspective view showing a projector 1 according to the first embodiment of the invention.

The projector 1 according to the present embodiment is a projection display device for modulating the light emitted from an illumination device 31 described later to thereby form an image corresponding to image information, and then projecting the image on a projection target surface such as a screen in an enlarged manner.

Although described later in detail, the projector 1 has a function of cooling a cooling object disposed in a sealed housing by circulating a gas as a coolant, then circulating a first liquid, to which the heat of the cooling object has been conducted, inside and outside the sealed housing, and then conducting the heat of the first liquid to a second liquid circulating in a circulation flow channel in the outside of the sealed housing to radiate the heat.

Figure 1:
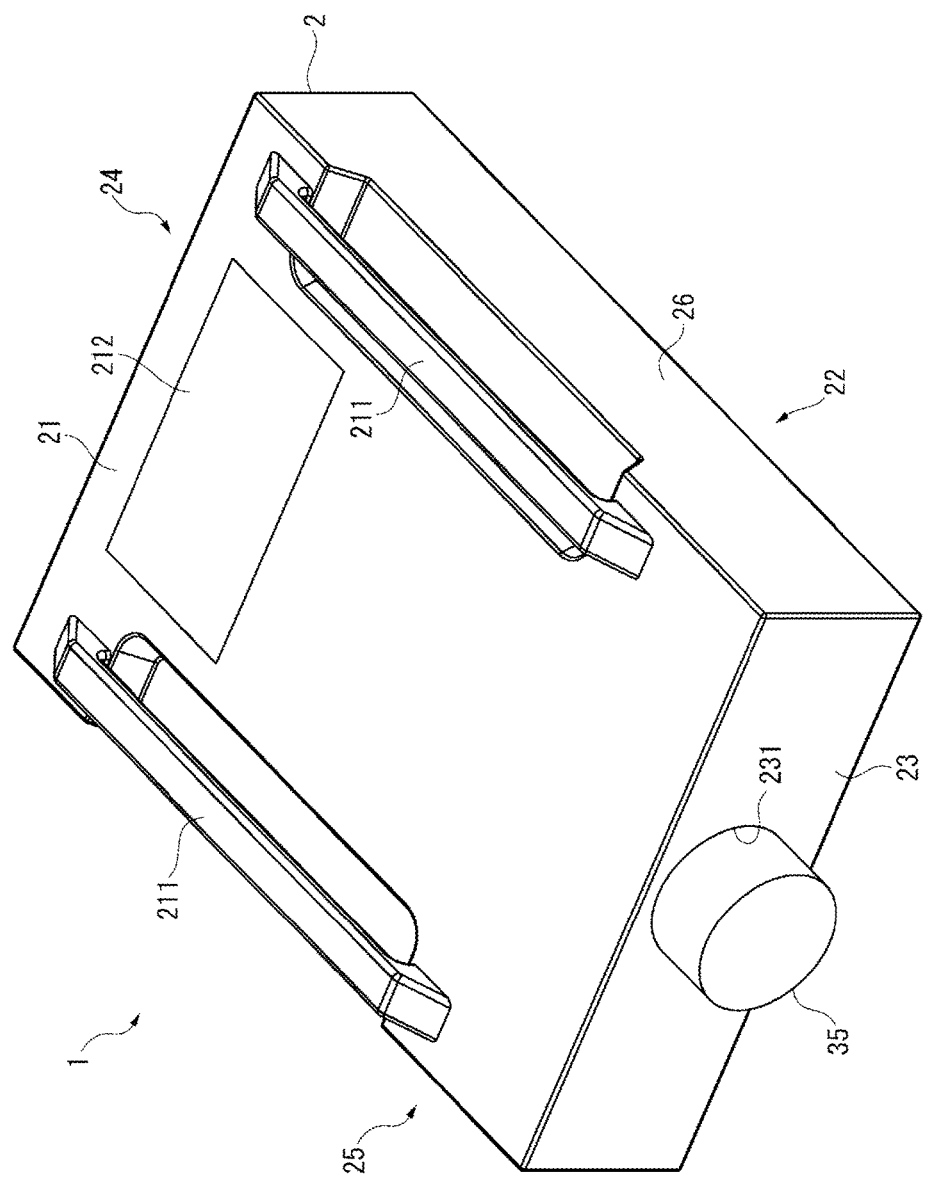
FIG. 1 is a schematic perspective view showing a projector according to a first embodiment of the invention.

As shown in FIG. 1, the projector 1 is provided with an exterior housing 2 constituting the exterior of the projector 1.

The exterior housing 2 is formed to have a roughly rectangular solid shape having a top surface section 21, a bottom surface section 22, a front surface section 23, a back surface section 24, and side surface sections 25, 26 located on the right and left sides.

The top surface section 21 is provided with a pair of grips 211 used when the user grips the projector 1, or when fixing the projector 1 to the equipment installed on the ceiling or the like. The top surface section 21 is provided with opening sections (not shown) for housing light source devices 31A, 31B described later inside the exterior housing 2 in an exchangeable manner, and the opening sections are covered with a cover member 212.

Although not shown in the drawings, the bottom surface section 22 is provided with a leg section having contact with an installation surface of an installation stand or the like when the projector 1 is installed on the installation surface.

The front surface section 23 is provided with an opening section 231 from which a part of a projection optical device 35 constituting an image forming device 3 described later is exposed.

Although not shown in the drawings, besides the above, the side surface section 26 located on the right side is provided with an inlet for introducing an air located in the outside of the exterior housing 2 to the inside, and the side surface section 25 located on the left side is provided with an outlet for discharging the air located in the inside of the exterior housing 2 to the outside.

Internal Configuration of Projector

Figure 2:
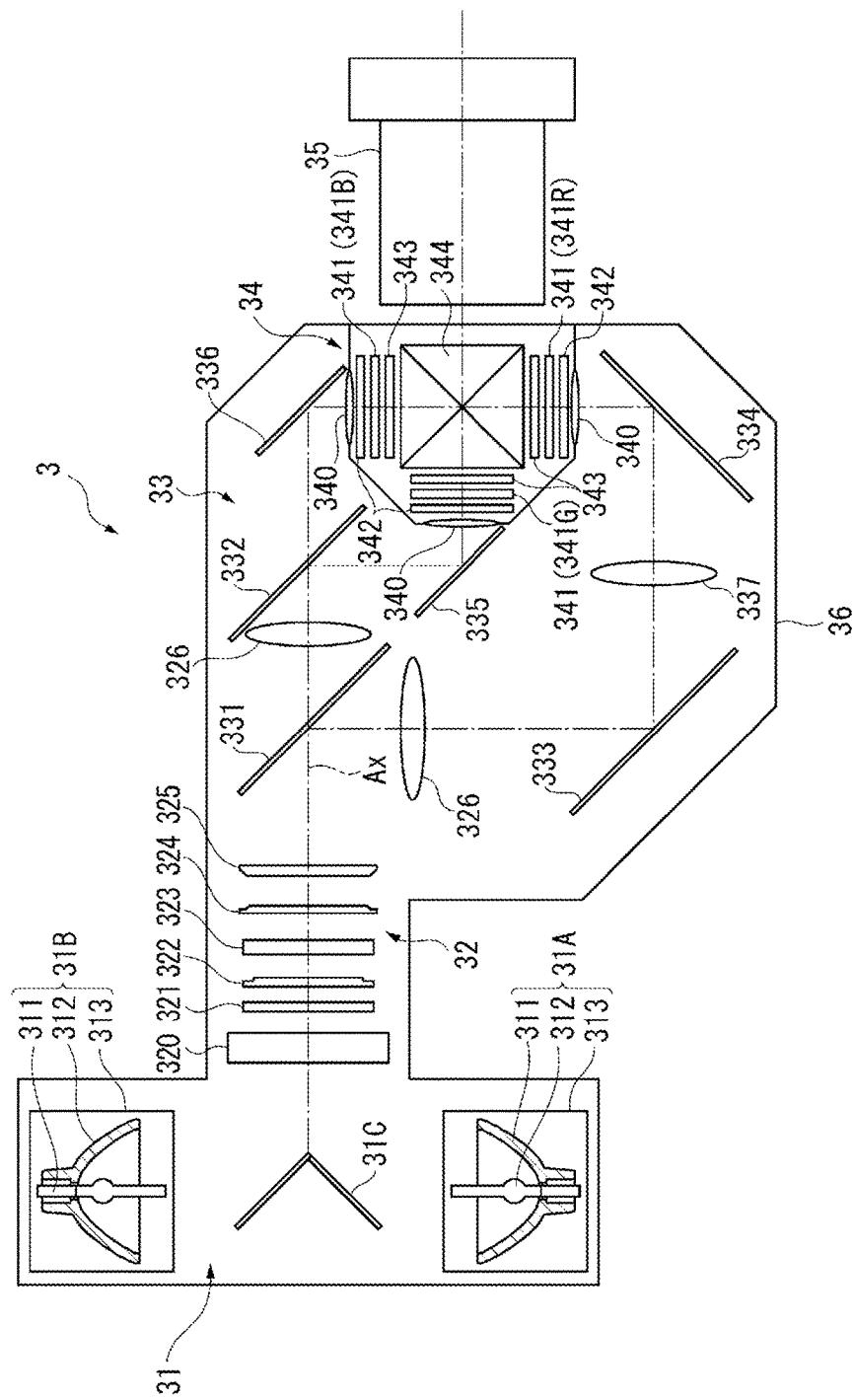
FIG. 2 is a schematic diagram showing a configuration of an image forming device in the first embodiment.

FIG. 2 is a schematic diagram showing a configuration of the image forming device 3.

As shown in FIG. 2, the projector 1 is provided with the image forming device 3 disposed inside the exterior housing 2 besides the exterior housing 2 described above. Besides the above, although not shown in the drawings, the projector 1 is provided with a control device for controlling the projector 1, and a power supply device for supplying electronic components constituting the projector 1 with electrical power.

Configuration of Image Forming Device

The image forming device 3 forms and then projects the image corresponding to the image information input from the control device described above. The image forming device 3 is provided with an illumination device 31, a homogenization device 32, a color separation device 33, an electro-optic device 34, a projection optical device 35, and an optical component housing 36.

Among these constituents, the optical component housing 36 is a box-like housing having the illumination optical axis Ax set inside, and the illumination device 31, the homogenization device 32, the color separation device 33, and the electro-optic device 34 are disposed at positions on the illumination optical axis Ax in the inside of the optical component housing 36. Further, the projection optical device 35 is located outside the optical component housing 36, but is disposed in accordance with the illumination optical axis Ax.

The illumination device 31 is provided with a pair of light source devices 31A, 31B disposed so as to be opposed to each other, and a reflecting mirror 31C disposed between the pair of light source devices 31A, 31B.

The pair of light source devices 31A, 31B are each provided with a light source lamp 311, a reflector 312, and a housing body 313 for housing the light source lamp 311 and the reflector 312 inside the housing body 313. Further, these light source devices 31A, 31B emit light toward the reflecting mirror 31C.

The reflecting mirror 31C reflects the light beams input from the respective light source devices 31A, 31B toward the same direction, and thus, makes the light beams enter the homogenization device 32.

The homogenization device 32 homogenizes the illuminance in a plane perpendicular to the central axis of the light beam emitted from the illumination device 31. The homogenization device 32 has a dimming device 320, a UV filter 321, a first lens array 322, a cinema filter 323, a second lens array 324, a polarization conversion element 325, and an overlapping lens 326.

Among these constituents, the polarization conversion element 325 is for uniforming the polarization direction of the light having entered the polarization conversion element 325 into one type, and is one of the optical components according to the invention.

The color separation device 33 separates the light beam input from the homogenization device 32 into three colored light beams of red (R), green (G), and blue (B). The color separation device 33 has dichroic mirrors 331, 332, reflecting mirrors 333 through 336, and a relay lens 337.

The electro-optic device 34 modulates each of the colored light beams, which have been separated into, in accordance with the image information, and then combines the colored light beams, having been modulated, with each other. The electro-optic device 34 has liquid crystal panels 341 (the liquid crystal panels for red, green, and blue are denoted by 341R, 341G, and 341B, respectively) as light modulation devices, field lenses 340, entrance side polarization plates 342, and exit side polarization plates 343 disposed for the respective colored light beams, and one color combining device 344. Among these constituents, as the color combining device 344, there can be adopted a dichroic prism. Further, each of the field lenses 340 is disposed between the entrance side polarization plate 342 and a corresponding one of the reflecting mirrors 334 through 336.

The projection optical device 35 is a projection lens for projecting the light beam (the light beam for forming an image) combined by the color combining device 344 on the projection target surface in an enlarged manner. As such a projection optical device 35, there can be adopted a combination lens having a plurality of lenses arranged in a lens tube.

Configuration of Cooling Device

Figure 3:
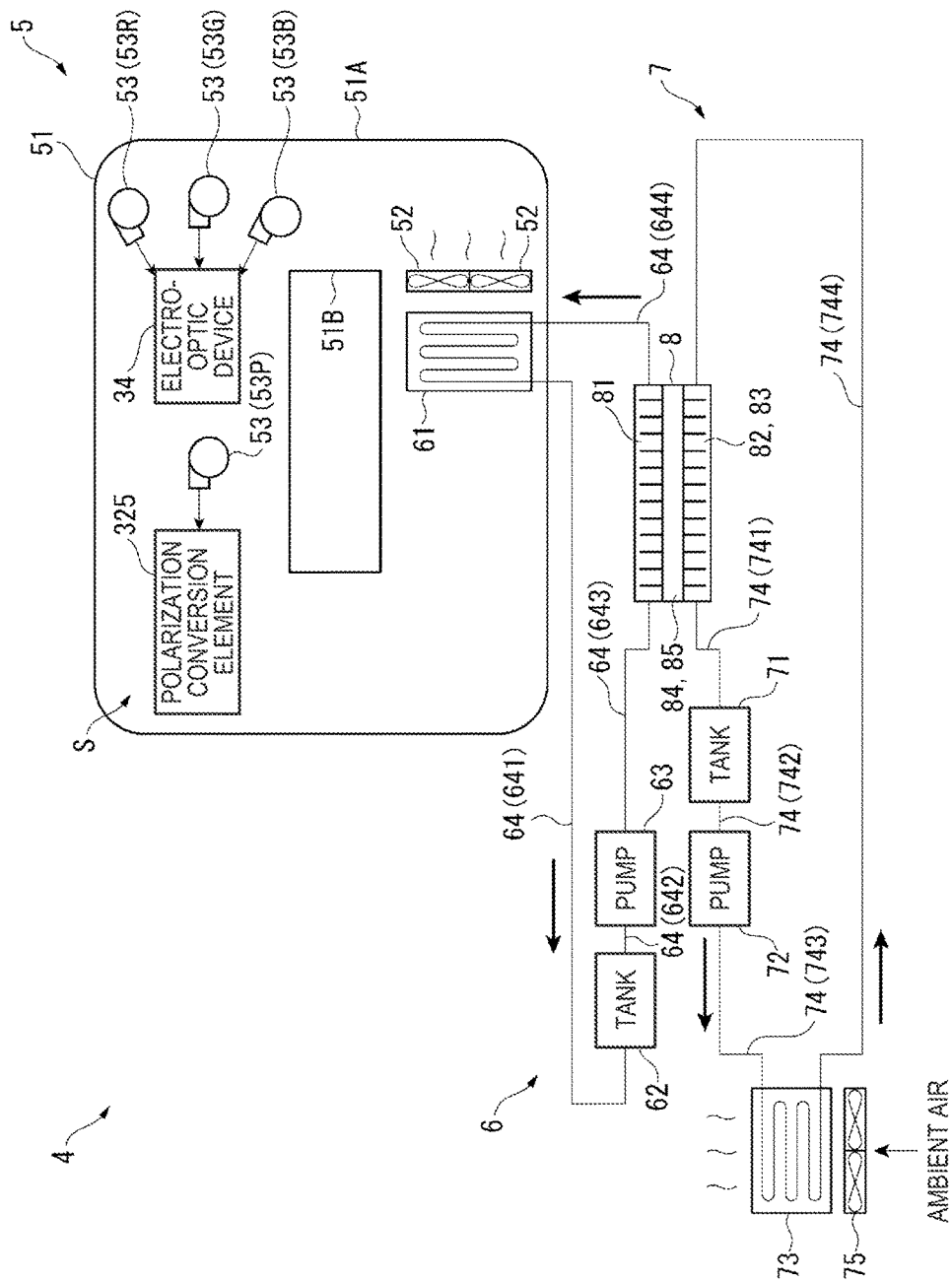
FIG. 3 is a block diagram showing a schematic configuration of a cooling device in the first embodiment.

FIG. 3 is a block diagram showing a schematic configuration of a cooling device 4.

The projector 1 is provided with the cooling device disposed inside the exterior housing 2 besides the constituents described above. The cooling device 4 is for circulating the cooling air in the sealed housing 51 to thereby cool the cooling objects (the electro-optic device 34 and the polarization conversion element 325 in the present embodiment) disposed inside the sealed housing 51, then conducting the heat of the cooling air used for cooling these cooling objects to a first liquid, then making the first liquid flow to the outside of the sealed housing 51, and then conducting the heat from the first liquid to a second liquid to radiate the heat.

As shown in FIG. 3, the cooling device 4 is provided with a circulatory cooling device 5, a heat absorbing device 6, a heat radiation device 7, and a heat exchange device 8.

Configuration of Circulatory Cooling Device

The circulatory cooling device 5 circulates the air inside the sealed housing 51 to cool the cooling objects disposed inside the sealed housing 51. The circulatory cooling device 5 is provided with circulation fans 52 and cooling fans 53 besides the sealed housing 51.

The sealed housing 51 is a housing in which the electro-optic device 34 and the polarization conversion element 325 as the cooling objects, the circulation fans 52, the cooling fans 53, and a heat absorber 61 constituting the heat absorbing device 6 described later are housed, and forms a sealed space S in which these constituents are disposed. The sealed housing 51 is configured as a sealed structure difficult for the air located outside the sealed housing 51 to flow in the inside of the sealed housing 51.

The sealed housing 51 has an outer wall section 51A constituting an outer edge of the sealed housing 51, and an inner wall section 51B constituting an inner surface, and by the outer wall section 51A and the inner wall section 51B combined with each other, the circulation flow channel having a ring-like shape is formed inside the sealed housing 51. On the circulation flow channel, there are disposed the cooling objects. Further, the sealed housing 51 has at least one opening section for housing the field lens 340. In other words, at least one of the field lenses 340 forms a part of the sealed housing 51 together with the optical component housing 36 described above. It should be noted that in the present embodiment, the electro-optic device 34 is located on the upstream side in the circulation flow channel, and the polarization conversion element 325 is located on the downstream side.

The circulation fans 52 suction the cooling air inside the sealed housing 51 and then eject the cooling air to thereby circulate the cooling air inside the sealed housing 51. The circulation fans 52 are each formed of an axial fan in the present embodiment, and there are disposed two circulation fans in the vicinity of the heat absorber 61 described later. However, besides this configuration, it is possible for the circulation fan 52 to be formed of a sirocco fan, and the number and the arrangement of the circulation fans 52 can arbitrarily be changed.

The cooling fans 53 each suction the air (the air circulated by the circulation fans 52 described above) inside the sealed housing 51, and then feed the air to the cooling objects described above via ducts (not shown). The cooling fans 53 include cooling fans 53R, 53G, and 53B disposed so as to correspond to the respective liquid crystal panels 341 of the electro-optic device 34 described above to feed the cooling air to the respective liquid crystal panels 341, and a cooling fan 53P for feeding the cooling air to the polarization conversion element 325. Such cooling fans 53 are each formed of a sirocco fan in the present embodiment, but can also be formed of an axial fan, and the number of the cooling fans 53 can arbitrarily be changed.

Configuration of Heat Absorbing Device

The heat absorbing device 6 absorbs the heat from the air circulating inside the sealed housing 51, and then conducts the heat to the heat exchange device 8. The heat absorbing device 6 has a heat absorber 61, a tank 62, a pump 63, and circulation pipes 64.

Among these constituents, the circulation pipes 64 (641 through 644) correspond to the heat-absorption-side circulation pipes according to the invention, and connect the heat absorber 61, the tank 62, the pump 63, and the heat exchange device 8 described later to each other, and the cooling liquid circulates inside the circulation pipes 64.

The heat absorber 61 is disposed inside the sealed housing 51, and the tank 62 and the pump 63 are disposed outside the sealed housing 51.

Among these constituents, the heat absorber 61 is connected to the tank 62 via the circulation pipe 641, and is also connected to the heat exchange device 8 via the circulation pipe 644. The heat absorber 61 absorbs the heat from the cooling air circulating inside the sealed housing 51 to cool the cooling air, and then conducts the heat thus absorbed to the cooling liquid circulating inside the heat absorber 61. The cooling liquid having been heated by the heat absorber 61 circulates toward the tank 62 via the circulation pipe 641.

The tank 62 is connected to the pump 63 via the circulation pipe 642. The tank 62 temporarily stores the cooling liquid circulating via the circulation pipes 641 through 644. Thus, the cooling liquid mixed with air or an impurity is inhibited from circulating through the pump 63.

The pump 63 corresponds to the first liquid pressure-feeding section according to the invention, and pressure-feeds the cooling liquid, which has flowed into the pump 63 via the circulation pipe 642, to the heat exchange device 8 via the circulation pipe 643.

Then, the cooling liquid, which has circulated to the heat exchange device 8, circulates again to the heat absorber 61 via the circulation pipe 644 in the state in which the cooling liquid is cooled by the heat exchange device 8 conducting the heat of the cooling liquid to a cooling liquid circulating through the heat radiation device 7. Thus, the cooling liquid low in temperature circulates through the heat absorber 61, and the cooling liquid provided with the heat, which has been absorbed from the cooling air inside the sealed housing 51 by the heat absorber 61, flows from the heat absorber 61 to the tank 62 via the circulation pipe 641. In such a manner, in the heat absorbing device 6, the cooling liquid is circulated by driving the pump 63.

It should be noted that the configuration of the heat exchange device 8 will be described later in detail.

Configuration of Heat Radiation Device

The heat radiation device 7 circulates the cooling liquid, to which the heat is conducted by the heat exchange device 8, to radiate the heat of the cooling liquid. The heat radiation device 7 is provided with a tank 71, a pump 72, a heat radiator 73, circulation pipes 74, and a cooling fan 75 for circulating the air through the heat radiator 73.

Among these constituents, the circulation pipes 74 (741 through 744) correspond to the heat-radiation-side circulation pipes according to the invention, and connect the tank 71, the pump 72, the heat radiator 73, and the heat exchange device 8 to each other, and the cooling liquid circulates inside the circulation pipes 74.

The tank 71 is for temporarily storing the cooling liquid circulating in the heat radiation device 7, and has substantially the same function as the function of the tank 62 described above. The tank 71 is connected to the heat exchange device 8 via the circulation pipe 741, and is connected to the pump 72 via the circulation pipe 742.

The pump 72 corresponds to the second liquid pressure-feeding section according to the invention, and pressure-feeds the cooling liquid, which has flowed into the pump 72 via the circulation pipe 742, to the heat radiator 73 via the circulation pipe 743.

The heat radiator 73 is a radiator for radiating the heat of the cooling liquid circulating inside the heat radiator 73 to thereby cool the cooling liquid. The cooling liquid having been cooled by the heat radiator 73 is circulated to the heat exchange device 8 via the circulation pipe 744.

In the heat radiation device 7 configured as described above, when the pump 72 is driven, the cooling liquid circulates through the pump 72, the heat radiator 73, the heat exchange device 8, and the tank 71 respectively connected by the circulation pipes 74. Thus, the heat conducted to the cooling liquid in the heat exchange device 8 is radiated by the heat radiator 73.

It should be noted that the cooling air, which has been located outside the exterior housing 2 and introduced by the cooling fan 75 through the inlet (not shown) of the side surface section 26, circulates in the heat radiator 73, and thus the heat radiator 73 is cooled. Then, the cooling air, which has been subject to cooling by the heat radiator 73, is discharged to the outside of the exterior housing 2 via the outlet (not shown) provided to the side surface section 25.

Configuration of Heat Exchange Device

Figure 4:
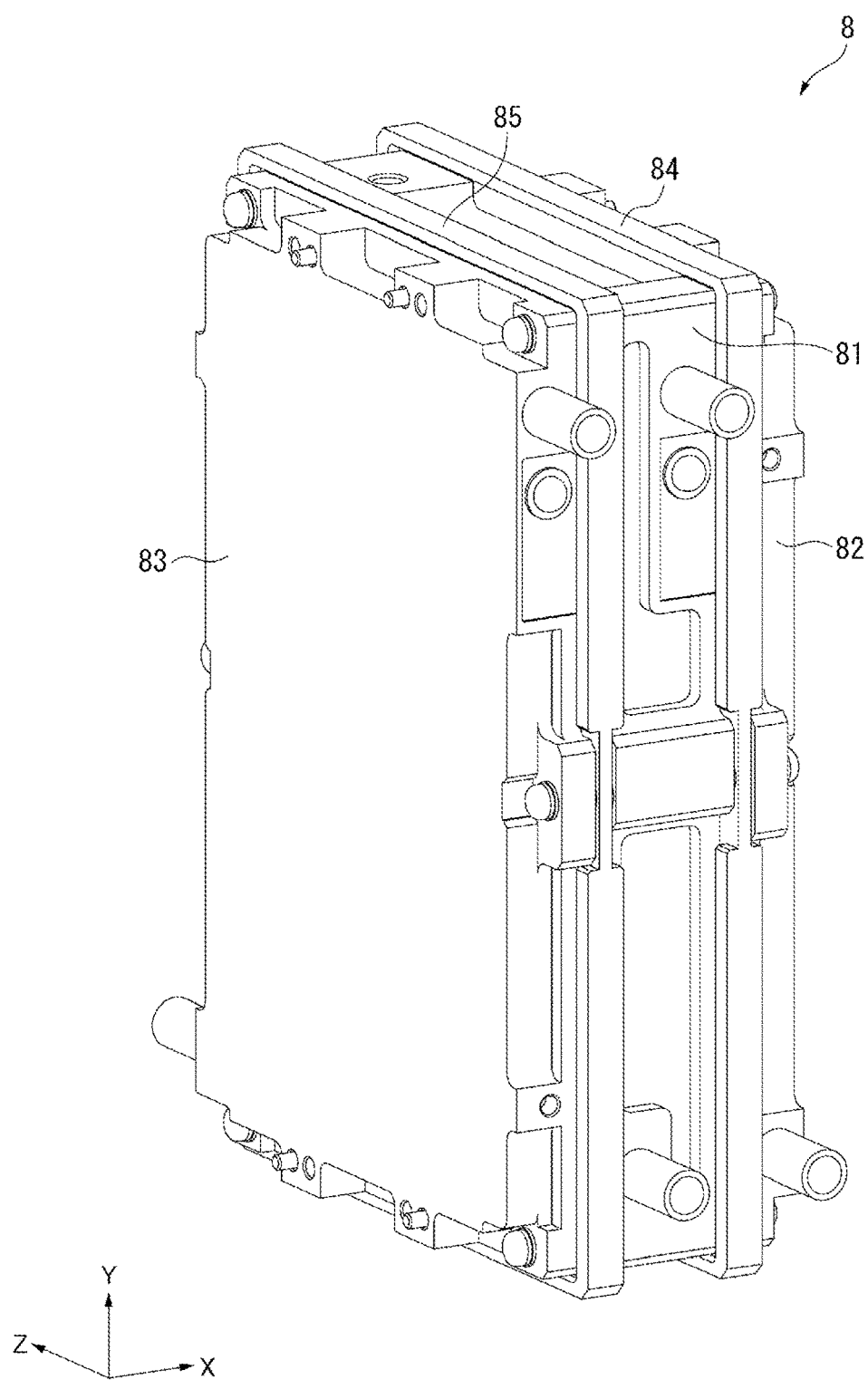
FIG. 4 is a perspective view showing a configuration of a heat exchange device in the first embodiment.
Figure 5:
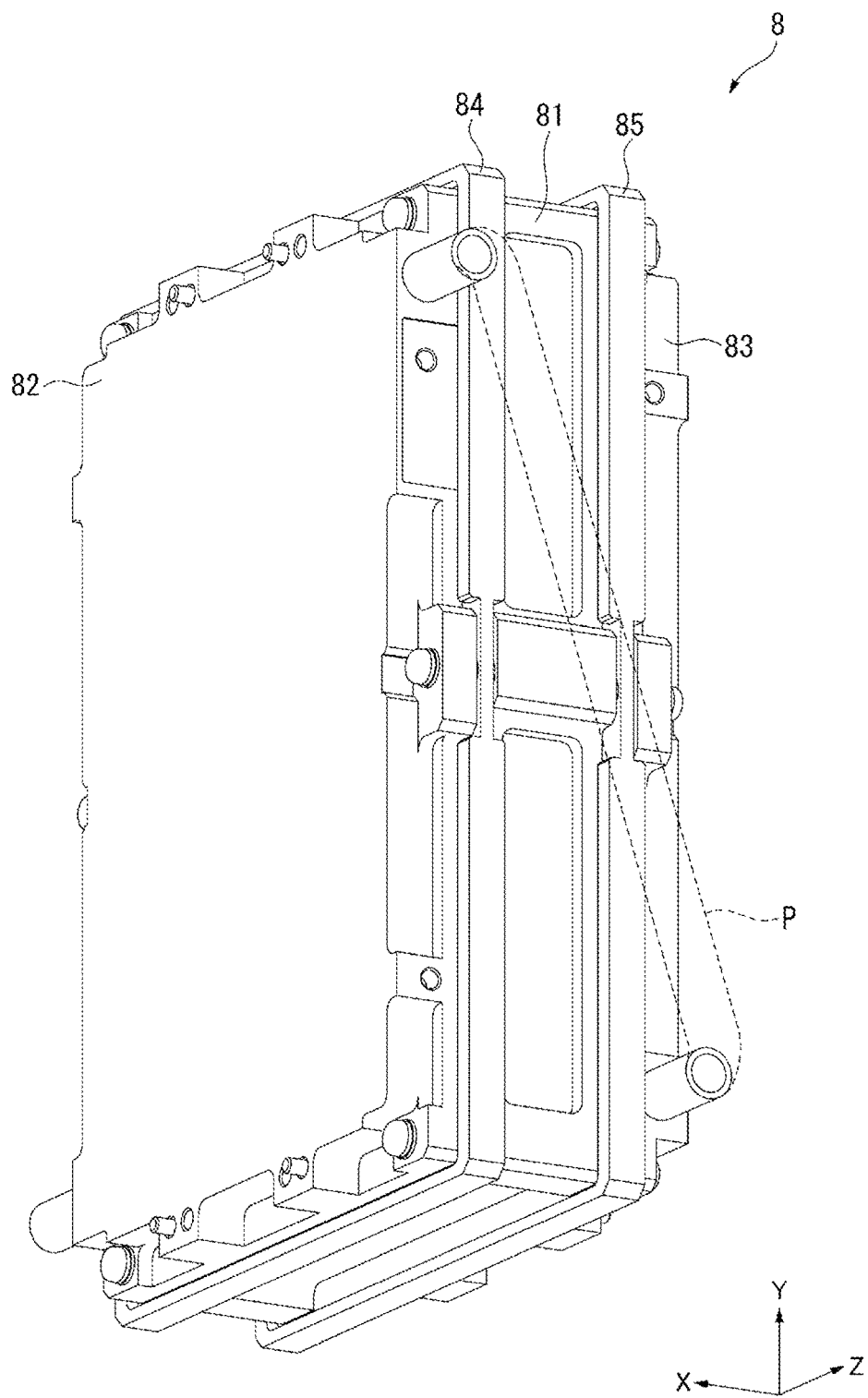
FIG. 5 is a perspective view showing a configuration of the heat exchange device in the first embodiment.
Figure 6:
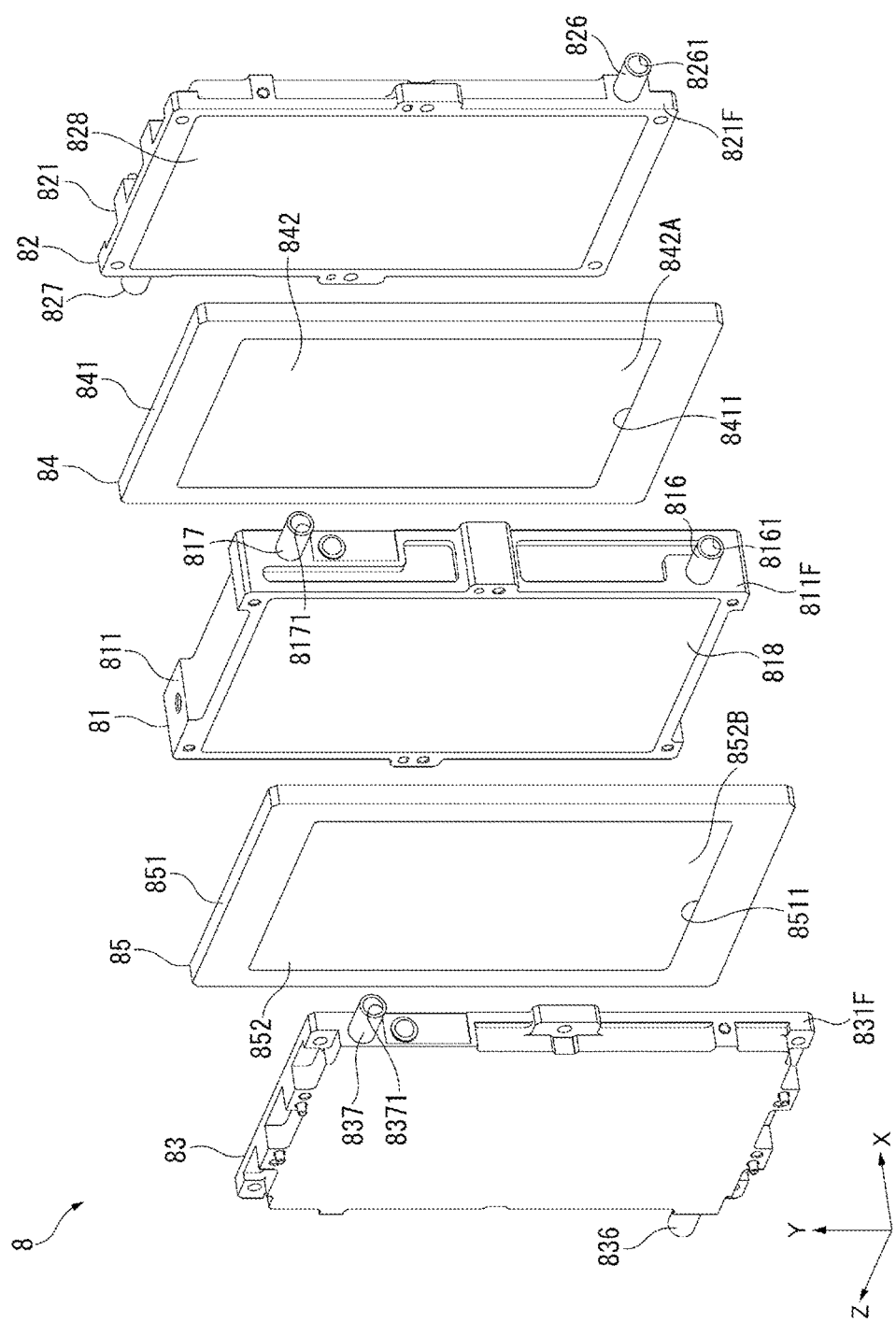
FIG. 6 is an exploded perspective view showing a configuration of the heat exchange device in the first embodiment.
Figure 7:
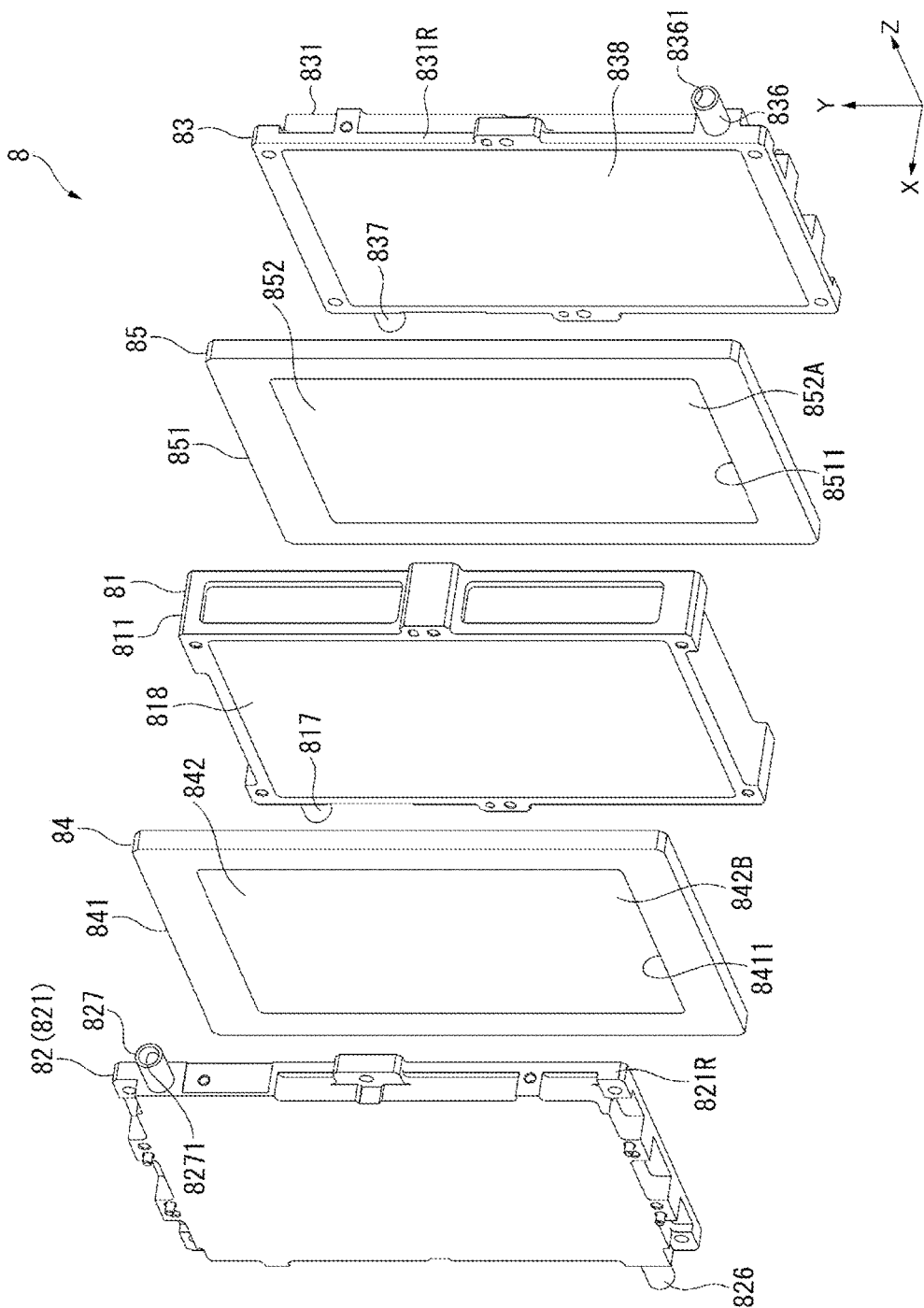
FIG. 7 is an exploded perspective view showing the configuration of the heat exchange device in the first embodiment.

FIGS. 4 and 5 are perspective views showing the configuration of the heat exchange device 8. Specifically, FIG. 4 is a perspective view of the heat exchange device 8 viewed from the upper front side, and FIG. 5 is a perspective view of the heat exchange device 8 viewed from the lower back side. Further, FIGS. 6 and 7 are exploded perspective views showing the configuration of the heat exchange device 8, wherein FIG. 6 is an exploded perspective view viewed from one end side (an outer member 83 side) of the heat exchange device 8, and FIG. 7 is an exploded perspective view viewed from the other end side (an outer member 82 side).

As described above, the heat exchange device 8 is a device for absorbing the heat from the cooling liquid (hereinafter referred to as a first liquid) circulating in the heat absorbing device 6, namely the cooling liquid to which the heat of the cooling air in the sealed housing 51 described above has been conducted, and then conducting the heat thus absorbed to the cooling liquid (hereinafter referred to as a second liquid) circulating in the heat radiation device 7 to thereby exchange the heat between the first liquid and the second liquid. As shown in FIGS. 4 through 7, the heat exchange device 8 is provided with an inner member 81, which is disposed at the center, and through which the first liquid circulates, a first outer member 82 and a second outer member 83 as the two outer members disposed at positions across the inner member 81 from each other, and two heat conduction devices 84, 85.

It should be noted that in the following description, it is assumed that the depth direction (the direction toward the back from the front) of the heat exchange device 8 is a Z direction, and among two directions perpendicular to the Z direction, a height direction (a direction from the bottom toward the top) is a Y direction, and a width direction (a direction from the left toward the right) is an X direction in the view of the drawing shown in FIG. 4. It should be noted that in the case in which the projector 1 is installed so that the bottom surface section 22 is opposed to an installation surface, or the projector 1 is supported by the grips 211 described above, the Y direction becomes a direction facing upward along the vertical direction.

Further, the first liquid and the second liquid are designations representing the fact that the liquids circulate in the different circulation flow channels, and can be liquids the same in component as each other. As such liquids, there can be cited water and an antifreeze solution such as propylene glycol.

Configuration of Inner Member

Figure 8:
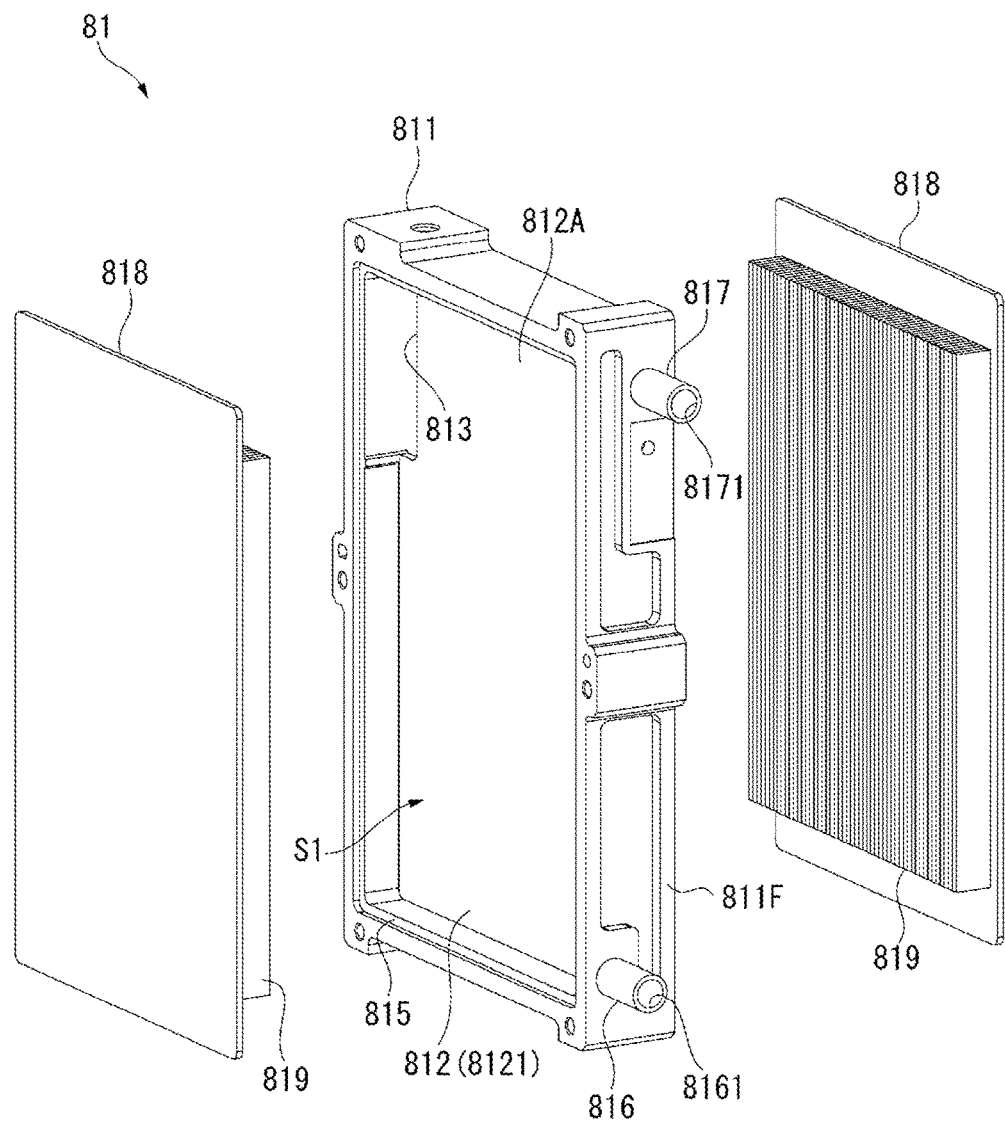
FIG. 8 is an exploded perspective view showing an inner member in the first embodiment.
Figure 8:
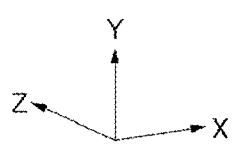
Figure 9:
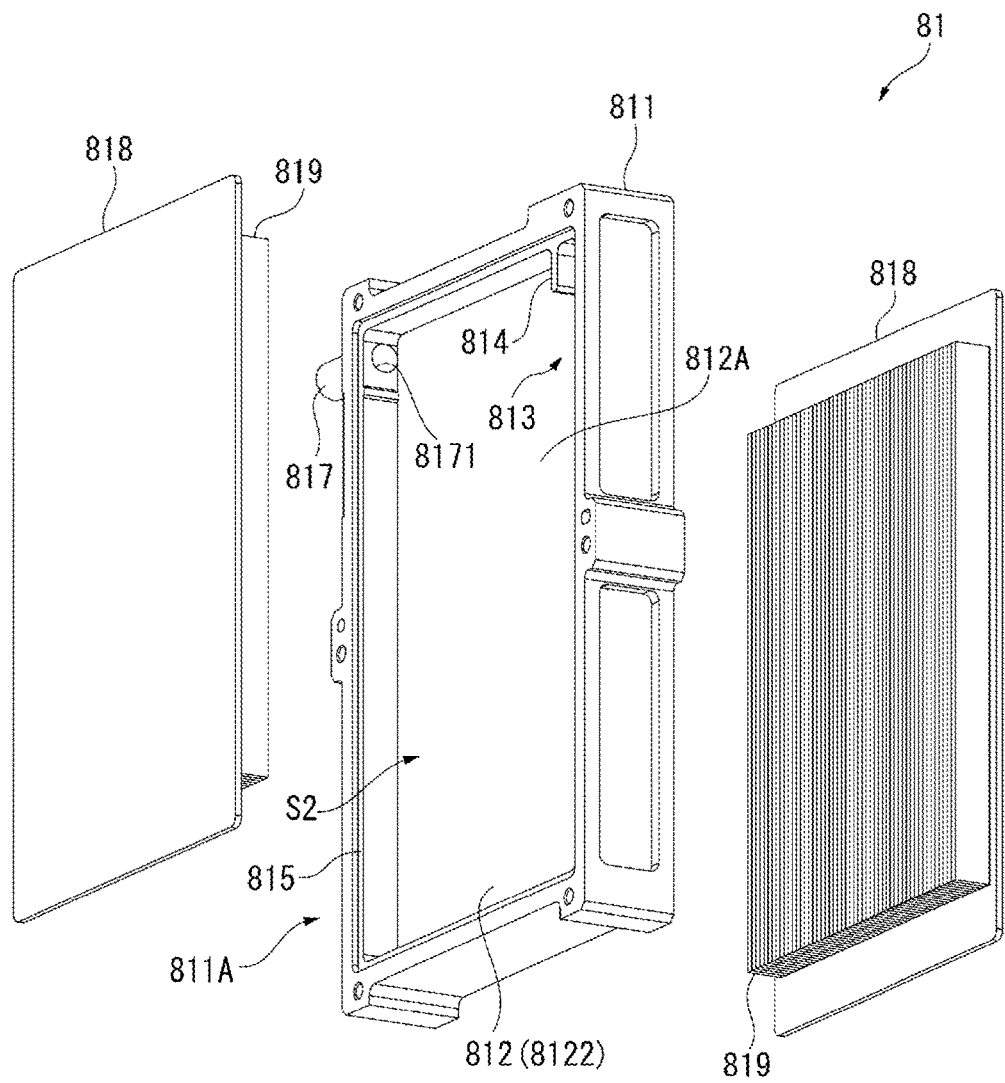
FIG. 9 is an exploded perspective view showing the inner member in the first embodiment.

FIGS. 8 and 9 are exploded perspective views showing the inner member 81. In the detailed description, FIG. 8 is an exploded perspective view of the inner member 81 viewed from the second outer member 83 side (the opposite side to the X direction), and FIG. 9 is an exploded perspective view of the inner member 81 viewed from the first outer member 82 side (the X-direction side).

The inner member 81 is disposed on the circulation flow channel of the first liquid circulating in the heat absorbing device 6 described above, and absorbs the heat of the first liquid. Specifically, the first liquid flows into the inner member 81 via the circulation pipe 643 described above, and the first liquid, the heat of which has been absorbed by the inner member 81, and which has been cooled, circulates from the inner member 81 toward the heat absorber 61 described above via the circulation pipe 644 described above.

As shown in FIGS. 8 and 9, such an inner member 81 has an inner housing 811, and two plate-like members 818 to be attached to the inner housing 811.

Among these constituents, the two plate-like members 818 each correspond to the first plate-like member according to the invention, and are each formed of a heat-conductive material such as metal so as to have a roughly rectangular shape. These plate-like members 818 are disposed at positions across the inner housing 811 from each other to cover and block a recessed section 812 provided to the inner housing 811. In each of these plate-like members 818, on the surface opposed to the inner housing 811, there is fixed a heat receiving member 819 so as to be able to achieve the heat conduction with the plate-like member 818.

Although the detailed illustration is omitted, the heat receiving member 819 has a configuration having a plurality of heat-conductive plates arranged so as to have gaps in between in a range of about several tens through several hundreds of micrometers, wherein each of the heat-conductive plates has a plane along the X-Y plane, and has a thickness dimension (a dimension in the Z direction) in a range of about several tens through several hundreds of micrometers. Further, fine flow channels through which the liquid circulates are formed between the heat-conductive plates, and by the liquid circulating between the heat-conductive plates, the heat of the liquid is conducted to the heat-conductive plates, namely, to the heat receiving member 819. Such heat receiving members 819 are disposed inside the recessed section 812 (8121, 8122) provided to the inner housing 811 in the case in which the plate-like members 818 are attached to the inner housing 811, and thus, it results that the first liquid circulates through the fine flow channels.

The inner housing 811 is formed to have a roughly rectangular solid shape having a longitudinal direction in the Y direction. The inner housing 811 is provided with the recessed section 812 recessed inward and formed in regions located on the X-direction side and the opposite side to the X-direction side. The recessed section 812 is divided by a division wall 812A along the Y-Z plane and passing through the center of the inner housing 811 into a first recessed section 8121 (FIG. 8) formed in the region located on the opposite side to the X-direction side and a second recessed section 8122 (FIG. 9) formed in the region located on the X-direction side. Further, a communication opening 813 for making the first recessed section 8121 and the second recessed section 8122 communicate with each other is formed at the position located on the Y-direction side and on the Z-direction side of the division wall 812A as shown in FIG. 8. A space S1 inside the first recessed section 8121 corresponds to the first space according to the invention, and a space S2 inside the second recessed section 8122 corresponds to the second space according to the invention.

It should be noted that in the periphery of the first recessed section 8121 and the second recessed section 8122, there are formed step sections 815 larger than the first recessed section 8121 and the second recessed section 8122, respectively, and the plate-like members 818 are fitted into the respective step sections 815. Therefore, the end surface on the opposite side to the X-direction side and the end surface on the X-direction side of the inner member 81 are each formed of the outer edge of the inner housing 811 and the plate-like member 818 as shown in FIGS. 6 and 7, and the end surfaces are each a flat surface.

Further, the inner housing 811 has an inflow section 816 and an outflow section 817 each having a roughly cylindrical shape projecting toward the opposite side to the Z-direction side located on the surface on the opposite side to the Z-direction side, namely the surface 811F on the front side in the heat exchange device 8.

The inflow section 816 is provided with an inlet 8161 communicating the outside and the inside of the first recessed section 8121 with each other, and the first liquid flowing into through the circulation pipe 643 described above connected to the inflow section 816 flows into the first recessed section 8121 through the inlet 8161. Therefore, the inlet 8161 corresponds to the inner-housing-side inlet according to the invention.

The outflow section 817 is provided with an outlet 8171 communicating the inside and the outside of the second recessed section 8122 with each other, and the first liquid in the second recessed section 8122 outflows to the circulation pipe 644 connected to the outflow section 817 through the outlet 8171. Therefore, the outlet 8171 corresponds to the inner-housing-side outlet according to the invention.

Figure 10:
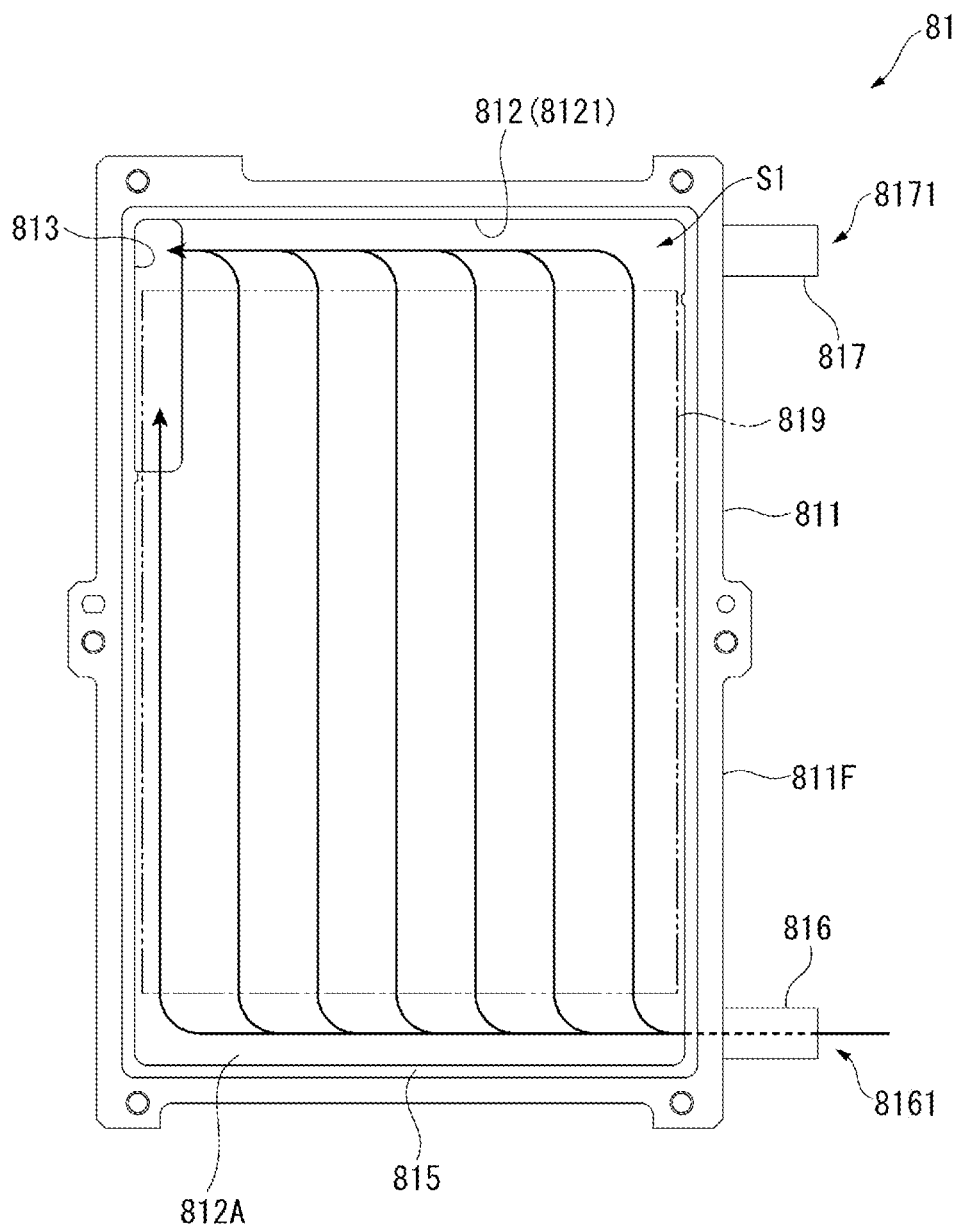
FIG. 10 is a side view showing an inner housing in the first embodiment.

FIG. 10 is a side view of the inner housing 811 viewed from the opposite side to the X-direction side, and is a diagram showing a flow channel of the first liquid having flowed into the first recessed section 8121.

Here, there will be described the flow channel of the first liquid, which flows into the first recessed section 8121 via the inlet 8161, then flows into the second recessed section 8122 through the communication opening 813, and is then discharged from the outlet 8171.

The first liquid having flowed into the first recessed section 8121 through the inlet 8161 circulates toward the Y direction through the fine flow channels of the heat receiving member 819 located inside the first recessed section 8121 and having contact with the division wall 812A as shown in FIG. 10. On this occasion, since the position of the end portion of the heat receiving member 819 on the opposite side to the Y-direction side is located on the Y-direction side of the inlet 8161, almost all of the first liquid having flowed into the first recessed section 8121 through the inlet 8161 circulates toward the Y direction through the fine flow channels described above. In this process, the heat of the first liquid is conducted to each of the heat-conductive plates of the heat receiving member 819, and thus, the first liquid is cooled.

Further, a part of the first liquid circulating along the Y direction directly reaches the communication opening 813. Further, since the end portion on the Y-direction side of the heat receiving member 819 is located on the opposite side to the Y-direction side of the inner edge on the Y-direction side of the first recessed section 8121, another part of the first liquid circulating along the Y direction circulates in the Z direction along the inner surface on the Y-direction side of the first recessed section 8121 and then reaches the communication opening 813. The first liquid having reached the communication opening 813 flows into the second recessed section 8122 through the communication opening 813.

It should be noted that the heat having been conducted to the heat receiving member 819 in the first recessed section 8121 is conducted to the plate-like member 818. Then, the heat having been conducted to the plate-like member 818 is absorbed by the heat conduction device 85 disposed between the plate-like member 818 and the second outer member 83, and is then conducted to the second outer member 83 by the heat conduction device 85.

Figure 11:
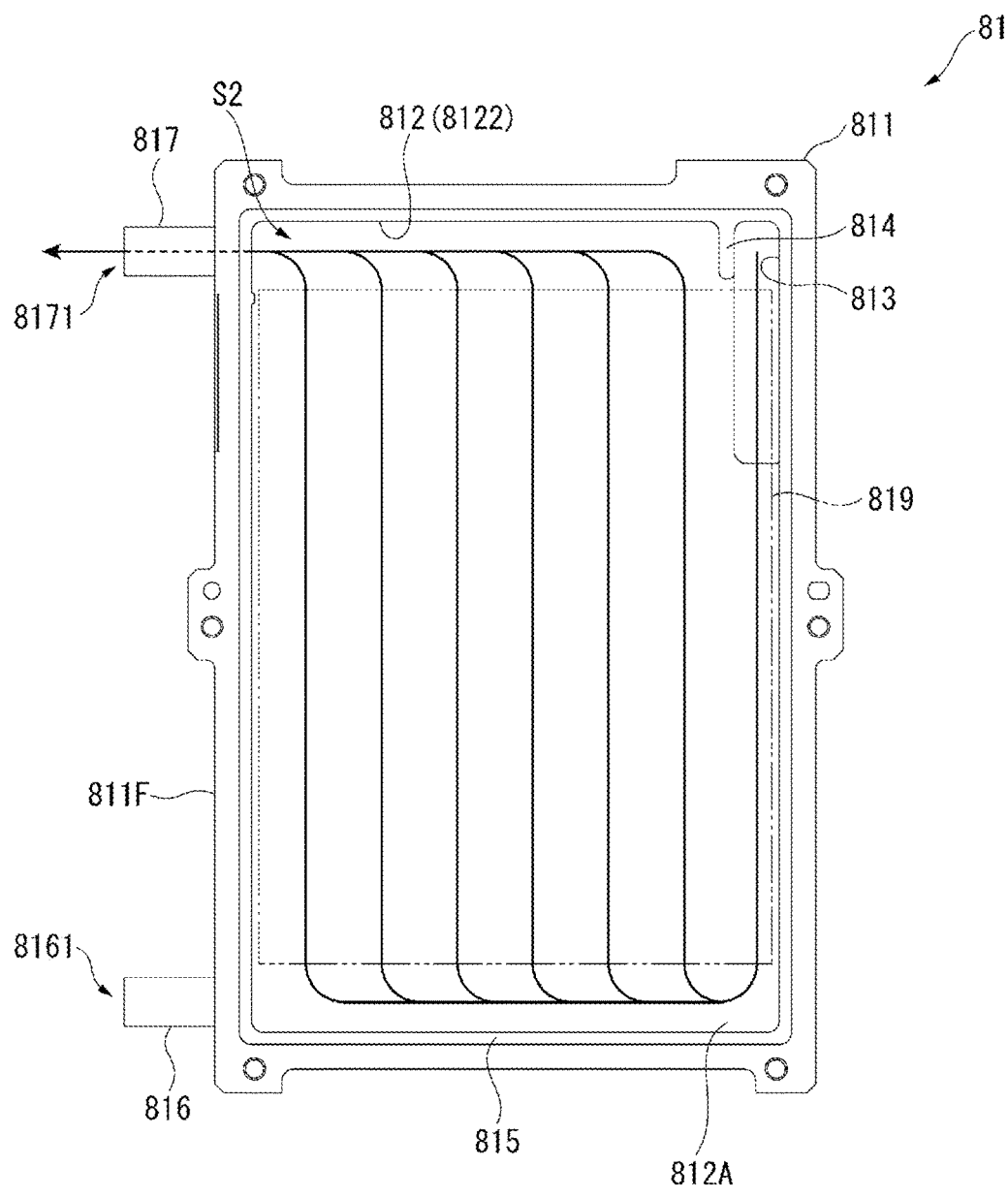
FIG. 11 is a side view showing the inner housing in the first embodiment.

FIG. 11 is a side view of the inner housing 811 viewed from the X-direction side, and is a diagram showing a flow channel of the first liquid having flowed into the second recessed section 8122.

The second recessed section 8122 is provided with an erecting section 814 erecting in the X direction from the division wall 812A, wherein the erecting section 814 extends in the opposite direction to the Y direction along an edge of the communication opening 813 as shown in FIG. 11.

The end portion on the Y-direction side of the erecting section 814 is connected to the inner surface on the Y-direction side of the second recessed section 8122, and the end portion on the opposite side to the Y-direction side is disposed inside the second recessed section 8122, and has contact with the edge on the Y-direction side of the heat receiving member 819 having contact with the division wall 812A. Further, a surface (a surface opposed to the second recessed section 8122) on the opposite side to the X-direction side of the plate-like member 818 for supporting the heat receiving member 819 has contact with the end portion on the X-direction side of the erecting section 814.

Therefore, the first liquid having flowed into the second recessed section 8122 through the communication opening 813 is difficult to circulate toward the opposite side to the Z-direction side, namely the outlet 8171 side, and therefore, circulates toward the opposite side to the Y-direction side through the fine flow channels of the heat receiving member 819.

The end portion on the opposite side to the Y-direction side of the heat receiving member 819 is located on the Y-direction side of the inner surface on the opposite side to the Y-direction side of the second recessed section 8122. Therefore, the first liquid having passed through the heat receiving member 819 circulates between the end portion on the opposite side to the Y-direction side of the heat receiving member 819 and the inner surface on the opposite side to the Y-direction side of the second recessed section 8122. Then, the parts of the first liquid flow again into the heat receiving member 819, and then circulate toward the Y-direction side through the fine flow channels. Thus, the heat of the first liquid is further conducted to the heat receiving member 819, and thus, the first liquid is cooled.

The end portion on the Y-direction side of the heat receiving member 819 is located on the opposite side to the Y-direction side of the inner surface on the Y-direction side of the second recessed section 8122. Therefore, the first liquid having reached the inner surface on the Y-direction side of the second recessed section 8122 circulates in the opposite direction to the Z direction, and then flows out to the circulation pipe 644 connected to the outflow section 817 via the outlet 8171 of the outflow section 817.

Subsequently, the first liquid having flowed out from the heat exchange device 8, namely the first liquid in the lowest temperature state, flows into the heat absorber 61 via the circulation pipe 644, and the heat exchange is performed between the first liquid and the cooling air in the sealed housing 51 described above by the heat absorber 61.

It should be noted that the heat having been conducted to the heat receiving member 819 in the second recessed section 8122 is absorbed by the heat conduction device 84 disposed between the plate-like member 818 and the first outer member 82 via the plate-like member 818, and is then conducted to the first outer member 82 by the heat conduction device 84.

Configuration of Heat Conduction Devices

Here, the heat conduction devices 84, 85 will be described.

As shown in FIGS. 4 through 7, the heat conduction device 84 is disposed between the inner member 81 and the first outer member 82, and the heat conduction device 85 is disposed between the inner member 81 and the second outer member 83. These heat conduction devices 84, 85 each absorb the heat having been conducted to the inner member 81, and then conduct the heat to opposed one of the first outer member 82 and the second outer member 83.

Among these devices, the heat conduction device 84 has a housing 841 and a thermoelectric conversion element 842 as shown in FIGS. 6 and 7.

The housing 841 is a resin member having a heat conductivity, and is formed to have a roughly rectangular shape elongated in the Y direction. The housing 841 is provided with an opening section 8411 penetrating the housing 841 in the X direction. The opening section 8411 functions as a setting section to which the thermoelectric conversion element 842 is fitted (disposed).

The thermoelectric conversion element 842 is a Peltier element in the present embodiment, and releases the heat, which has been absorbed by a heat absorbing surface, by a heat release surface in accordance with a voltage applied by the control device described above.

Such a thermoelectric conversion element 842 is disposed in the opening section 8411 so that the heat absorbing surface 842A faces to the first outer member 82, and the heat release surface 842B faces to the inner member 81. Further, the heat absorbing surface 842A is connected to the plate-like member 818 located on the X-direction side of the inner member 81 so as to be able to conduct the heat, and the heat release surface 842B is connected to a plate-like member 828 described later of the first outer member 82 so as to be able to conduct the heat.

The heat conduction device 85 has substantially the same configuration as that of the heat conduction device 84 described above. Specifically, as shown in FIGS. 6 and 7, the heat conduction device 85 is provided with a housing 851 and a thermoelectric conversion element 852, and these constituents have substantially the same configuration as that of the housing 841 and the thermoelectric conversion element 842 described above.

Further, in the heat conduction device 85, the thermoelectric conversion element 852 is fitted into an opening section 8511, a heat absorbing surface 852A is connected to the plate-like member 818 located on the opposite side to the X-direction side of the inner member 81 so as to be able to conduct the heat, and a heat release surface 852B is connected to a plate-like member 838 described later of the second outer member 83 so as to be able to conduct the heat.

Configuration of First Outer Member

Figure 12:
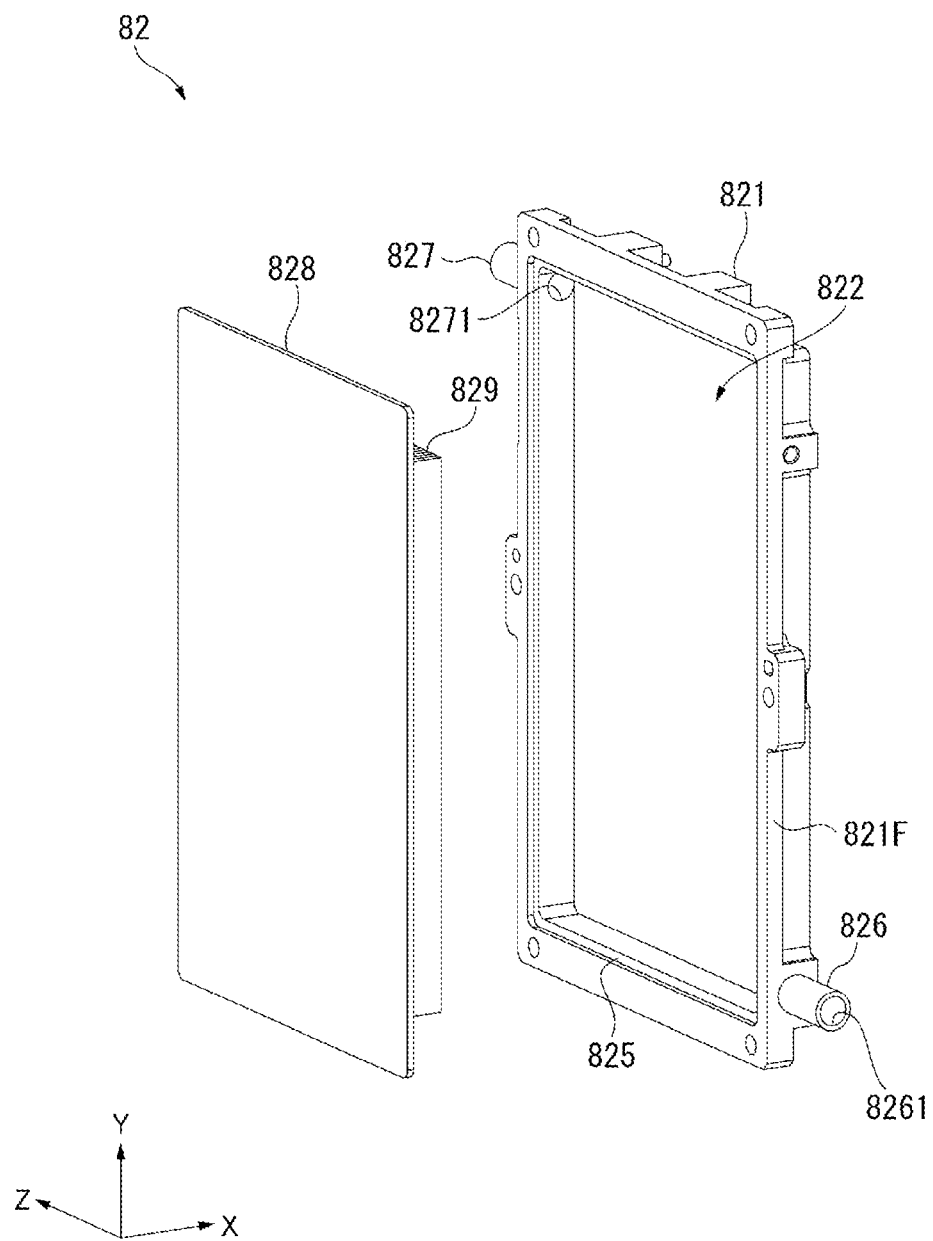
FIG. 12 is an exploded perspective view showing a first outer member in the first embodiment.
Figure 13:
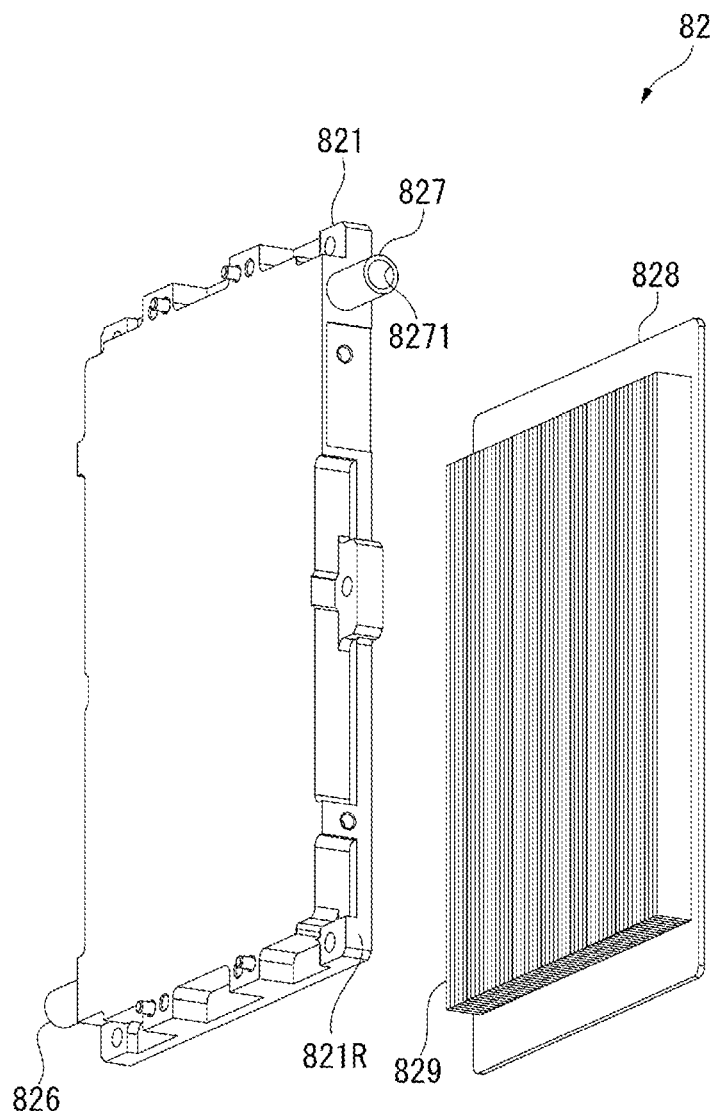
FIG. 13 is an exploded perspective view showing the first outer member in the first embodiment.

FIGS. 12 and 13 are exploded perspective views showing the first outer member 82. In the detailed description, FIG. 12 is an exploded perspective view of the first outer member 82 viewed from the opposite side (the inner member 81 side) to the X-direction side, and FIG. 13 is an exploded perspective view of the first outer member 82 viewed from the X-direction side.

The first outer member 82 and the second outer member 83 each correspond to the outer member according to the invention, and are disposed on the circulation flow channel of the second liquid formed of the heat radiation device 7 described above, and conduct the heat of the first liquid conducted from the heat conduction devices 84, 85 to the second liquid.

As shown in FIGS. 12 and 13, the first outer member 82 has a housing 821 as the outer housing, and the plate-like member 828 as the second plate-like member to be attached to the housing 821.

Among these constituents, the plate-like member 828 is formed of a heat-conductive material such as metal similarly to the plate-like member 818 described above, and the heat release surface 842B of the thermoelectric conversion element 842 of the heat conduction device 84 described above is connected to the plate-like member 828 so as to be able to conduct the heat. To the plate-like member 828, there is attached a heat release member 829, which is disposed in a recessed section 822 provided to the housing 821 in the case in which the plate-like member 828 is attached to the housing 821.

The heat release member 829 has a configuration in which a plurality of heat-conductive plates is arranged along the Z direction similarly to the heat receiving member 819 described above, and these heat-conductive plates form a plurality of fine flow channels along the Y direction.

Figure 14:
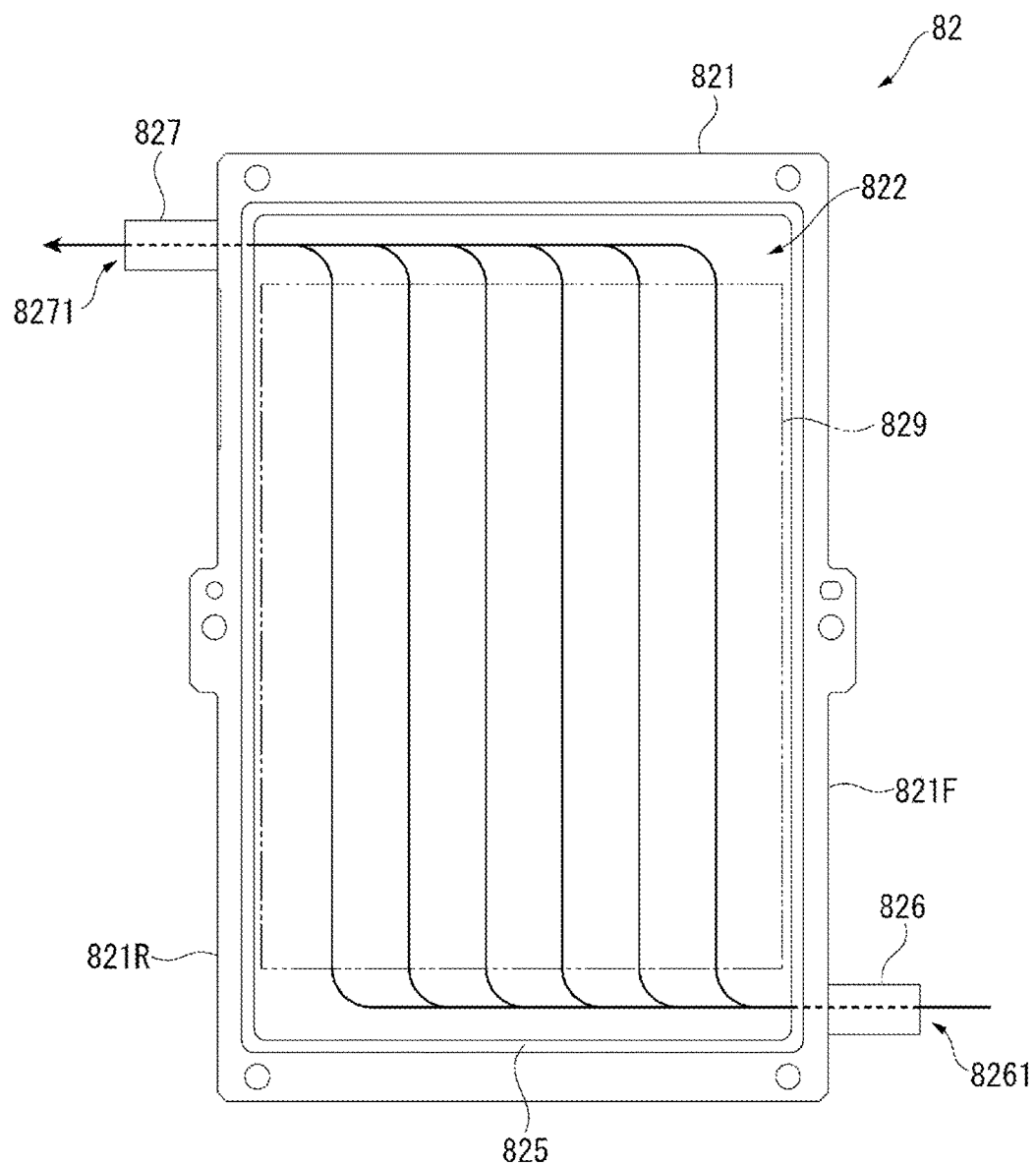
FIG. 14 is a side view showing a housing in the first embodiment.

FIG. 14 is a side view of the housing 821 viewed from the opposite side to the X-direction side.

The housing 821 is formed of a heat-conductive material. As shown in FIGS. 12 and 14, the housing 821 is provided with the recessed section 822 having a roughly rectangular shape, and on the periphery of the recessed section 822, there is formed a step section 825 similar to the step section 815 described above. In the case in which the plate-like member 828 described above is fitted into the step section 825, the heat release member 829 described above is disposed in the recessed section 822. It should be noted that a surface on the opposite side to the X-direction side of the plate-like member 828 is a flat surface, and therefore, a surface on the opposite side to the X-direction side of the first outer member 82 is a flat surface.

Besides the above, the housing 821 has an inflow section 826 to be connected to the circulation pipe 744 described above in the vicinity of the end portion on the opposite side to the Y-direction side of the front surface 821F as a surface on the opposite side to the Z-direction side, and the inflow section 826 is provided with an inlet 8261 communicated with the inside of the recessed section 822. The inlet 8261 corresponds to the outer-housing-side inlet according to the invention. It should be noted that since the inflow section 826 is connected to the heat radiator 73 via the circulation pipe 744, the second liquid flowing into the inlet 8261 is the second liquid in the lowest temperature state in the circulation flow channel of the second liquid.

Further, the housing 821 has an outflow section 827 to be connected to a pipe P (see FIG. 5) in the vicinity of the end portion on the Y-direction side of the back surface 821R as a surface on the Z-direction side, and the outflow section 827 is provided with an outlet 8271 communicated with the inside of the recessed section 822. The outlet 8271 corresponds to the outer-housing-side outlet according to the invention.

Here, as shown in FIG. 14, the end portion on the opposite side to the Y-direction side of the heat release member 829 disposed in the recessed section 822 is located on the Y-direction side of the inlet 8261. Therefore, almost all of the second liquid having flowed into the recessed section 822 from the inlet 8261 through the circulation pipe 744 circulates toward the Y-direction side through the fine flow channels of the heat release member 829. In this process, the heat having been conducted to the plate-like member 828, namely the heat release member 829, by the thermoelectric conversion element 842 of the heat conduction device 84 described above is conducted to the second liquid. Since the end portion on the Y-direction side of the heat release member 829 is located on the opposite side to the Y-direction side of the inner surface on the Y-direction side of the recessed section 822, the second liquid to which the heat is conducted in such a manner circulates toward the Z-direction side along the inner surface, and is then discharged to the pipe P from the outlet 8271 described above.

Configuration of Second Outer Member

Figure 15:
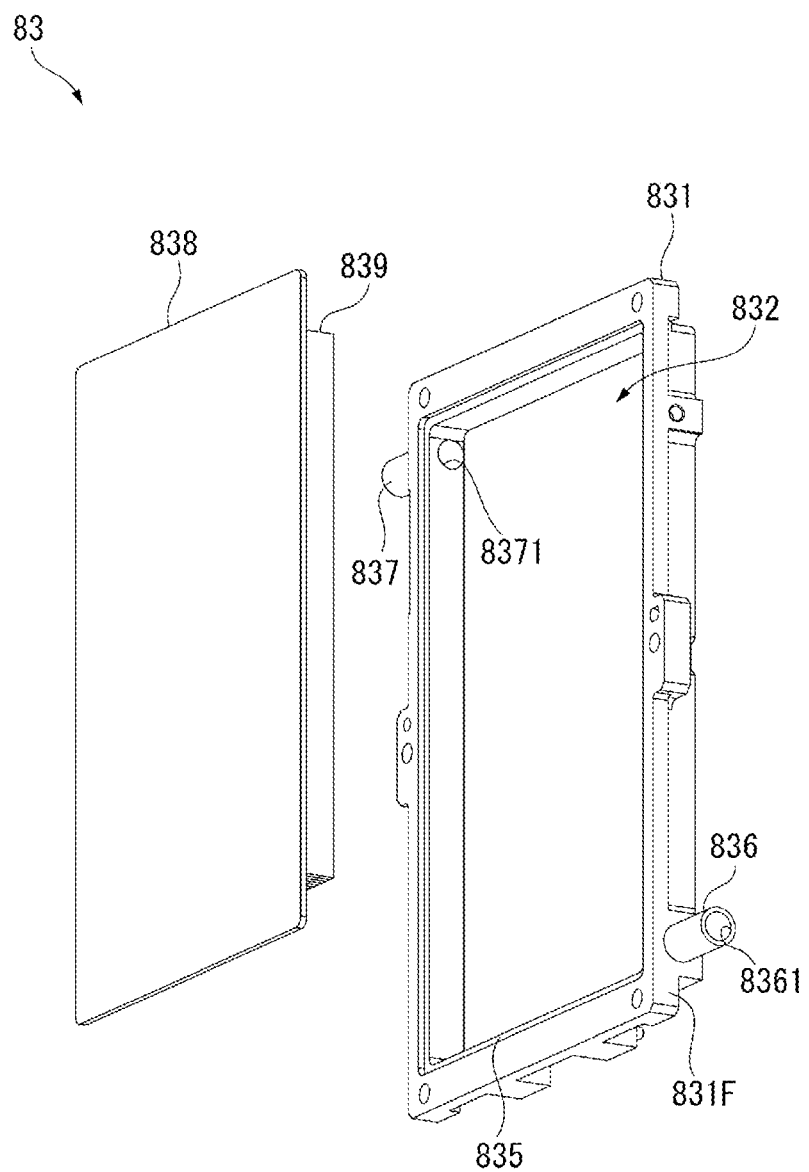
FIG. 15 is an exploded perspective view showing a second outer member in the first embodiment.

FIG. 15 is an exploded perspective view of the second outer member 83 viewed from the X-direction side.

Figure 17:
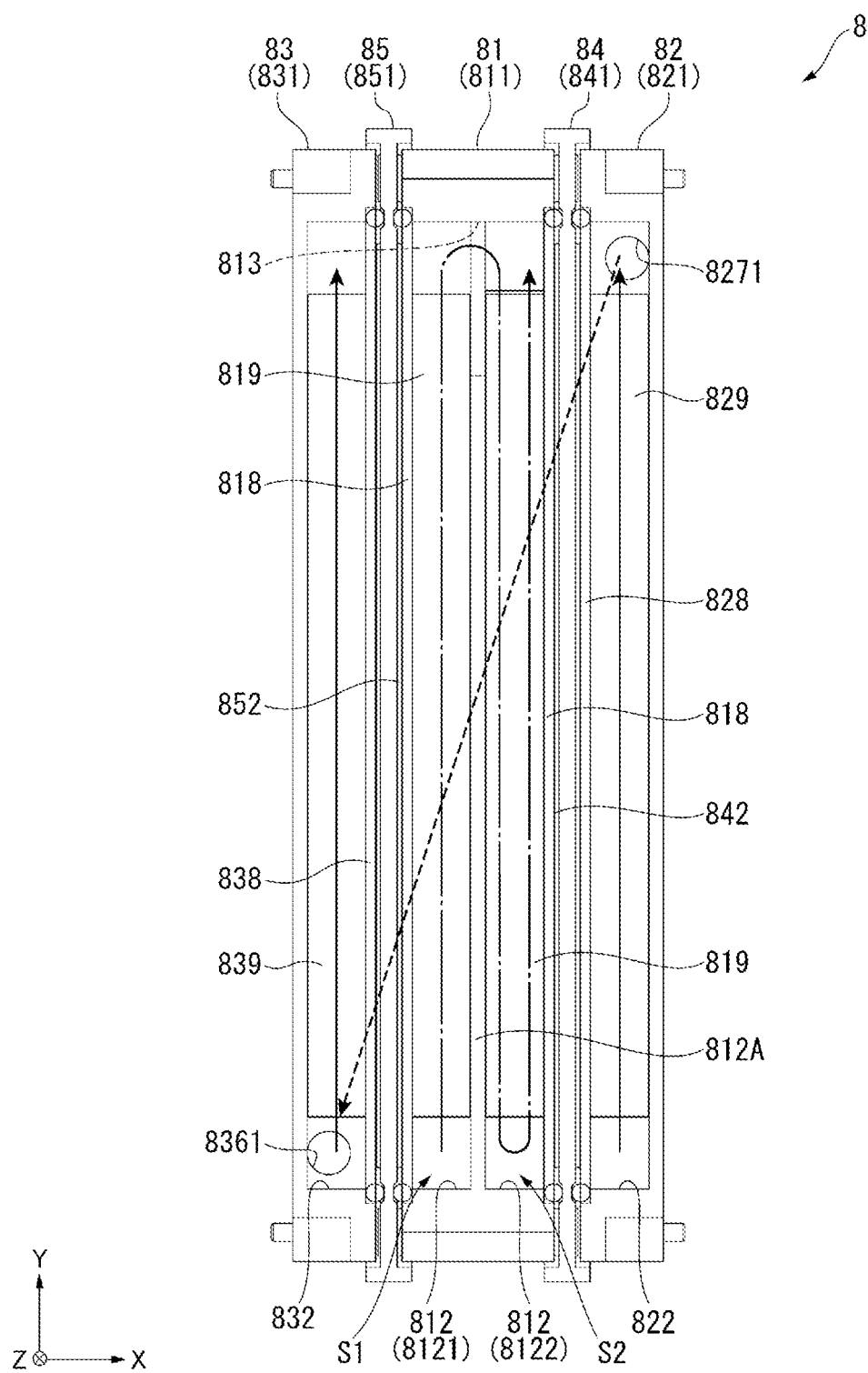
FIG. 17 is a cross-sectional view showing the heat exchange device in the first embodiment.

The second outer member 83 releases the heat having been conducted from the heat conduction device 85, namely the heat having been absorbed from the first liquid in the space S1 of the inner member 81, to the second liquid circulating through the first outer member 82. The second outer member 83 has substantially the same configuration as that of the first outer member 82, and as shown in FIG. 17, the second outer member 83 has a housing 831 as the outer housing, and the plate-like member 838 as the second plate-like member to be attached to the housing 831.

Among these constituents, the plate-like member 838 is formed of a heat-conductive material such as metal similarly to the plate-like members 818, 828 described above, and the heat release surface 852B of the thermoelectric conversion element 852 of the heat conduction device 85 described above is connected to the plate-like member 838 so as to be able to conduct the heat. To the plate-like member 838, there is attached a heat release member 839, which is disposed in a recessed section 832 provided to the housing 831 in the case in which the plate-like member 838 is attached to the housing 831.

In the heat release member 839, a plurality of heat-conductive plates is arranged along the Z direction similarly to the heat receiving member 819 described above and the heat release member 829 described above, and these heat-conductive plates form a plurality of fine flow channels along the Y direction.

Figure 16:
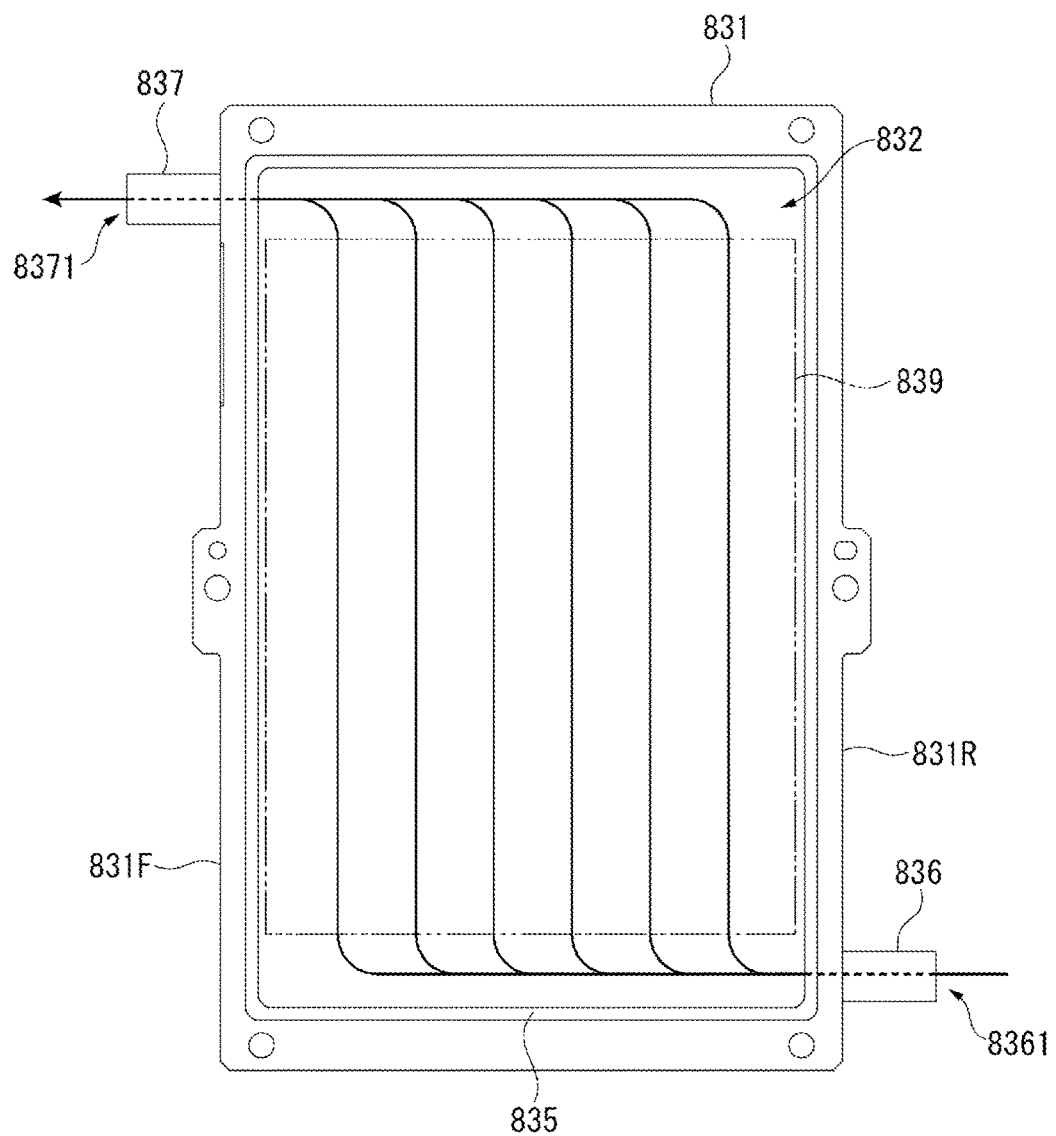
FIG. 16 is a side view showing a housing in the first embodiment.

FIG. 16 is a side view of the housing 831 viewed from the X-direction side.

The housing 831 is formed of a heat-conductive material so as to be mirror-symmetrical to the housing 821. As shown in FIGS. 15 and 16, the housing 831 is provided with the recessed section 832 having a roughly rectangular shape, and on the periphery of the recessed section 832, there is formed a step section 835 similar to the step sections 815, 825 described above. In the case in which the plate-like member 838 described above is fitted into the step section 835, the heat release member 839 described above is disposed in the recessed section 832. It should be noted that similarly to the first outer member 82 described above, a surface on the X-direction side of the second outer member 83 is a flat surface.

Further, the housing 831 has an inflow section 836 to be connected to the pipe P described above in the vicinity of the end portion on the opposite side to the Y-direction side of the back surface 831R as a surface on the Z-direction side, and the inflow section 836 is provided with an inlet 8361 communicated with the inside of the recessed section 832. The inlet 8361 corresponds to the outer-housing-side inlet according to the invention.

Further, the housing 831 has an outflow section 837 to be connected to the circulation pipe 741 (see FIG. 3) in the vicinity of the end portion on the Y-direction side of the front surface 831F as a surface on the opposite side to the Z-direction side, and the outflow section 837 is provided with an outlet 8371 communicated with the inside of the recessed section 832. The outlet 8371 corresponds to the outer-housing-side outlet according to the invention.

Here, as shown in FIG. 16, the end portion on the opposite side to the Y-direction side of the heat release member 839 disposed in the recessed section 832 is located on the Y-direction side of the inlet 8361. Therefore, almost all of the second liquid having flowed into the recessed section 832 from the inlet 8361 through the pipe P circulates toward the Y-direction side through the fine flow channels of the heat release member 839. In this process, the heat having been conducted by the thermoelectric conversion element 852 of the heat conduction device 85 described above is conducted to the second liquid. Since the end portion on the Y-direction side of the heat release member 839 is located on the opposite side to the Y-direction side of the inner surface on the Y-direction side of the recessed section 832, the second liquid to which the heat is conducted in such a manner circulates toward the opposite side to the Z-direction side along the inner surface, and is then discharged to the circulation pipe 741 from the outlet 8371 described above.

Thus, the second liquid having been discharged to the circulation pipe 741, namely the second liquid to which the heat of the first liquid has been conducted, circulates to the heat radiator 73 via the tank 71 and the pump 72, the heat of the second liquid is radiated by the heat radiator 73, and the second liquid thus cooled flows again into the first outer member 82.

Flow Channels of First Liquid and Second Liquid in Heat Exchange Device

FIG. 17 is a cross-sectional view of the heat exchange device 8 in the X-Y plane, and is a diagram showing the circulation directions of the first liquid and the second liquid in the heat exchange device 8.

Here, the flow channels of the first liquid and the second liquid in the heat exchange device 8 will be described.

As described above, the first liquid flows into the first recessed section 8121 of the inner member 81 via the inlet 8161 located on the opposite side to the Y-direction side of the front surface 811F of the inner member 81. As indicated by the dashed-dotted arrow in FIG. 17, the first liquid circulates through the fine flow channels of the heat receiving member 819 in the first recessed section 8121 toward the Y-direction side, and then flows into the second recessed section 8122 via the communication opening 813 located on the back side. Subsequently, the first liquid circulates toward the opposite side to the Y-direction side through the fine flow channels of the heat receiving member 819 in the second recessed section 8122, then circulates toward the Y-direction side through the rest of the fine flow channels, and is then discharged to the outside through the outlet 8171 (not shown) located on the Y-direction side of the front surface of the inner member 81.

In this circulation process of the first liquid, the heat is absorbed from the first liquid by the heat receiving members 819 respectively located in the first recessed section 8121 and the second recessed section 8122, and the heat is conducted to the plate-like members 828, 838 of the first outer member 82 and the second outer member 83 by the thermoelectric conversion elements 842, 852.

Meanwhile, the second liquid having flowed into the recessed section 822 via the inlet 8261 located on the opposite side to the Y-direction side of the front surface 821F of the first outer member 82 circulates toward the Y-direction side through the fine flow channels of the heat release member 829 as indicated by the solid arrow in FIG. 17. In this process, the heat of the first liquid conducted via the thermoelectric conversion element 842 is conducted to the second liquid, and then the second liquid is discharged to the pipe P (see FIG. 5) via the outlet 8271 located on the Y-direction side of the back surface 821R of the first outer member 82.

The pipe P is connected to the inflow section 836 located on the opposite side to the Y-direction side of the back surface 831R of the second outer member 83. Therefore, the second liquid having been discharged from the first outer member 82 flows into the recessed section 832 of the second outer member 83 via the inlet 8361 as indicated by the dotted arrow in FIG. 17.

The second liquid having flowed into the recessed section 832 circulates toward the Y-direction side through the fine flow channels of the heat release member 839 as indicated by the solid arrow in FIG. 17. In this process, the heat of the first liquid conducted via the thermoelectric conversion element 852 is conducted to the second liquid, and then the second liquid is discharged to the outside via the outlet 8371 located on the Y-direction side of the front surface 831F of the second outer member 83.

Here, the first liquid flowing into the first recessed section 8121 of the inner member 81 is the first liquid having flowed therein from the heat absorber 61 via the tank 62 and the pump 63, and is therefore relatively high in temperature. On the other hand, the second liquid flowing into the second outer member 83 to which the heat of the first liquid is conducted via the thermoelectric conversion element 852 is the second liquid heated via the first outer member 82, and is therefore relatively high in temperature. Therefore, the difference in temperature between the plate-like member 818 for supporting the heat receiving member 819 disposed in the first recessed section 8121 and the plate-like member 838 for supporting the heat release member 839 disposed in the recessed section 832 is apt to be small. It should be noted that in the Peltier element, the relatively smaller the difference in temperature between the heat absorbing surface and the heat release surface is, the higher the heat conduction efficiency from the heat absorbing surface side to the heat release surface side is.

Therefore, by disposing the thermoelectric conversion element 852 having the Peltier element between the plate-like members 818, 838 to conduct the heat from the plate-like member 818 to the plate-like member 838, it is possible to increase the heat conduction efficiency compared to the case of, for example, conducting the heat to the plate-like member 828 relatively low in temperature.

Further, the first liquid flowing into the second recessed section 8122 of the inner member 81 is the first liquid from which the heat has been absorbed in the first recessed section 8121 as described above, and is therefore relatively low in temperature. On the other hand, the second liquid flowing into the first outer member 82 to which the heat of the first liquid is conducted via the thermoelectric conversion element 842 is the second liquid cooled by the heat radiator 73, and is therefore relatively low in temperature. Therefore, the difference in temperature between the plate-like member 818 for supporting the heat receiving member 819 disposed in the second recessed section 8122 and the plate-like member 828 for supporting the heat release member 829 disposed in the recessed section 822 is apt to be small.

Therefore, by disposing the thermoelectric conversion element 842 having the Peltier element between the plate-like members 818, 828 to conduct the heat from the plate-like member 818 to the plate-like member 828, it is possible to increase the heat conduction efficiency compared to the case of, for example, conducting the heat to the plate-like member 838 relatively high in temperature.

Therefore, the heat of the first liquid to which the heat has been conducted from the cooling air heated by cooling the cooling objects in the sealed housing 51 can effectively be conducted to the second liquid, and thus, the first liquid can effectively be cooled.

According to the projector 1 related to the present embodiment described hereinabove, the following advantages can be obtained.

Among the plate-like members 828, 838 provided to the first outer member 82 and the second outer member 83 sandwiching the inner member 81, the plate-like member 828 is disposed so as to be opposed to the plate-like member 818, and the plate-like member 838 is disposed so as to be opposed to the plate-like member 818. According to this configuration, the heat having been conducted from the first liquid circulating in the inner member 81 can be conducted to the plate-like member 828 via one of the two plate-like members 818, and then the heat can be conducted to the plate-like member 838 via the other of the plate-like members 818. Thus, the heat having been conducted to the plate-like members 828, 838 can be conducted to the second liquid circulating in the first outer member 82 and the second outer member 83. Therefore, since the heat conduction area from the inner member 81 can be increased, the heat of the first liquid circulating in the inner member 81 can efficiently be conducted to the second liquid circulating in the first outer member 82 and the second outer member 83.

Further, even in the case in which the heat of the first liquid is absorbed by the thermoelectric conversion elements 842, 852, and thus the temperature of the first liquid becomes lower than the temperature of the inside of the projector 1, since the inner member 81 through which the first liquid circulates is sandwiched by the first outer member 82 and the second outer member 83 through which the second liquid having a relatively high temperature circulates, it is possible to inhibit dew condensation from occurring in the heat exchange device 8.

In each of the two plate-like members 818, on the surface opposed to the inner housing 811, there is fixed the heat receiving member 819 so as to be able to achieve the heat conduction with the plate-like member 818. According to this configuration, the heat of the first liquid received by the heat receiving members 819 can efficiently be conducted to the respective plate-like members 818. Therefore, the heat of the first liquid can efficiently be conducted to the second liquid.

Further, the heat release members 829, 839 are fixed to the corresponding plate-like members 828, 838, respectively, so as to be able to conduct the heat. According to this configuration, the heat of the first liquid having been received by the plate-like members 828, 838 can efficiently be conducted to the heat release members 829, 839, and further, efficiently conducted to the second liquid. Therefore, the heat of the first liquid can efficiently be conducted to the second liquid.

Since the space in the inner housing 811 is partitioned by the division wall 812A into the space S1 located on the upstream side and the space S2 located on the downstream side, the heat received from the first liquid circulating in the space S1 located on the upstream side can be conducted to the second outer member 83, and further, the heat received from the first liquid circulating in the space S2 can be conducted to the first outer member 82. According to this configuration, it is possible to provide a temperature difference between the heat conducted from the space S1 side and the heat conducted from the space S2 side. Therefore, it is possible to reduce the difference in temperature between the plate-like member 818 and the plate-like member 838 and the difference in temperature between the plate-like member 818 and the plate-like member 828. Therefore, the heat of the plate-like members 818 can efficiently be conducted to the plate-like members 828, 838 using the thermoelectric conversion elements 852, 842.

Since the spaces S1, S2 in the inner housing 811 are communicated with each other by the communication opening 813 provided to the division wall 812A, the first liquid flowing out from the space S1 can be guided to the space S2 without disposing a pipe. Therefore, it is possible to simplify the configuration of the inner member 81, and further, the configuration of the heat exchange device 8.

The division wall 812A is formed along the Y direction along the vertical direction, and the communication opening 813 is located in the vicinity of the end portion on the upper side in the vertical direction of the division wall. According to this configuration, it is possible to make the first liquid circulate from the lower side in the vertical direction to thereby fill the space S1 with the first liquid, and then guide the first liquid to the space S2. Therefore, the first liquid having circulated along the heat receiving member 819 in the space S1, namely the first liquid the heat of which has been received by the heat receiving member 819, and which has been cooled, can surely be guided to the space S2. Therefore, the heat can surely be received from the first liquid, and the heat of the first liquid can surely be conducted to the second liquid via the second outer member 83.

Since the second liquid to which the heat of the first liquid is not yet conducted circulates in the first outer member 82 located on the upstream side in the flow channel of the second liquid, the temperature of the second liquid is relatively low. In contrast, since the first liquid, the heat of which has been received in the space S1, circulates in the space S2, the temperature of the first liquid is relatively low.

On the other hand, since the second liquid, to which the heat has been conducted in the first outer member 82 located on the upstream side in the flow channel of the second liquid, circulates in the second outer member 83 located on the downstream side, the temperature of the second liquid is relatively high. In contrast, since the first liquid, the heat of which has not been received yet, circulates in the space S1, the temperature of the first liquid is relatively high.

Since the difference in temperature between the plate-like members 818, 828 corresponding to each other, and the difference in temperature between the plate-like members 818, 838 corresponding to each other can be decreased as described above, the heat conduction by the thermoelectric conversion elements 842, 852 can efficiently be performed. Therefore, the heat conduction from the plate-like member 818 to the plate-like member 828, and the heat conduction from the plate-like member 818 to the plate-like member 838 can efficiently be performed.

Since the inlet 8161 and the outlet 8171 are located on the front surface 811F, the total dimension of the inner member 81 can be decreased compared to the case in which the inlet 8161 and the outlet 8171 are located on respective surfaces different from each other. Therefore, the inner member 81, furthermore, the heat exchange device 8, can be miniaturized, and thus space saving in the projector 1 can be achieved.

In the case in which the inlet 8161 is located on the upper side in the vertical direction, and the outlet 8171 is located on the lower side in the vertical direction, there is a possibility that the first liquid flows out without filling the space in the inner housing 811 with the first liquid. In such a case, there is a possibility that the heat cannot sufficiently be received from the first liquid.

In contrast, since the inlet 8161 is located on the lower side in the vertical direction, the outlet 8171 is located on the upper side in the vertical direction, the space in the inner housing 811 can be filled with the first liquid, and thus, the heat can surely be received from the first liquid in the space. Therefore, the heat conduction from the first liquid to the second liquid can surely be performed.

The outlet 8271 of the first outer member 82 and the inlet 8361 of the second outer member 83 are connected to each other with the pipe P. According to this configuration, there is no need to circulate the second liquid individually to the outer members 82, 83. Therefore, there is no need to use the configuration (e.g., a manifold) for guiding the second liquid to each of the outer members 82, 83 by branching the flow channel of the second liquid. Therefore, the piping for guiding the second liquid to each of the outer members 82, 83 can easily be achieved, and further, the configuration of the heat exchange device 8 can be simplified.

The outlet 8271 of the first outer member 82 and the inlet 8361 of the second outer member 83 are located on the back surfaces 821R, 831R, respectively. According to this configuration, it is possible to make it easy to connect the outlet 8271 and the inlet 8361 to each other.

Further, the inlet 8261 of the first outer member 82 and the outlet 8371 of the second outer member 83 are located on the front surfaces 821F, 831F, respectively. According to this configuration, since the circulation pipes 744, 741 of the heat radiation device 7 can be connected to the inlet 8261 and the outlet 8371, respectively, on the same side of the heat exchange device 8, the connection of the inlet 8261 and the outlet 8371 to the circulation flow channel of the second liquid can easily be achieved.

Further, the inlets 8261, 8361 of the respective outer members 82, 83 are located on the lower side in the vertical direction, and the outlets 8271, 8371 are located on the upper side in the vertical direction. According to this configuration, the spaces in the respective outer members 82, 83 can be filled with the second liquid similarly to the case in the inner member 81 described above. Therefore, since the heat conducted from the inner member 81 can surely be released to the second liquid in the space, the heat having been received from the first liquid can surely be conducted to the second liquid.

Between the plate-like member 818 located on the opposite side to the X-direction side in the inner member 81 and the plate-like member 838 of the second outer member 83, there is disposed the thermoelectric conversion element 852 so that the heat absorbing surface 852A is connected to the plate-like member 818, and the heat release surface 852B is connected to the plate-like member 838. Further, between the plate-like member 818 located on the X-direction side in the inner member 81 and the plate-like member 828 of the first outer member 82, there is disposed the thermoelectric conversion element 842 so that the heat absorbing surface 842A is connected to the plate-like member 818, and the heat release surface 842B is connected to the plate-like member 828. According to this configuration, the heat of the first liquid conducted to each of the plate-like members 818 can efficiently be conducted to the corresponding plate-like members 828, 838. Therefore, the heat of the first liquid can efficiently be conducted to the second liquid via the heat release members 829, 839 supported by the plate-like members 828, 838, respectively.

Further, as described above, since the difference in temperature between the plate-like member 818 located on the opposite side to the X-direction side in the inner member 81 and the plate-like member 838 of the second outer member 83 is small, and the difference in temperature between the plate-like member 818 located on the X-direction side in the inner member 81 and the plate-like member 828 of the first outer member 82 is also small, the heat conduction efficiency by the thermoelectric conversion elements 852, 842 can be increased. Therefore, the heat conduction from the first liquid to the second liquid can more effectively be performed.

In the cooling device 4, since the first liquid having circulated in the heat absorbing device 6, and the second liquid the heat of which is radiated by the heat radiation device 7 circulate in the heat exchange device 8, due to the heat exchange device 8 capable of efficiently conducting the heat from the first liquid to the second liquid, the polarization conversion element 325 and the electro-optic device 34 as the cooling objects can effectively be cooled.

In the cooling device 4, the heat absorbing device 6 is provided with the heat absorber 61 for absorbing the heat of the cooling objects, and then conducting the heat to the first liquid, and can therefore effectively cool the cooling objects due to the heat exchange device 8 described above receiving the heat of the first liquid to thereby cool the first liquid. Further, by the heat radiator 73 of the heat radiation device 7 radiating the heat of the second liquid conducted from the first liquid using the heat exchange device 8, the second liquid can efficiently be cooled. Therefore, the heat of the cooling objects can effectively be cooled via the first liquid and the second liquid.

Since the cooling objects are cooled by the circulatory cooling device 5 for circulating the cooling air in the sealed housing 51, and the heat of the cooling air is absorbed by the heat absorber 61 described above, the rise in temperature in the sealed housing 51 can be suppressed, and the cooling objects can effectively be cooled.

Further, as described above, the cooling objects disposed in the sealed housing 51 are the electro-optic device 34 including the liquid crystal panel 341 as the light modulation device, and the polarization conversion element 325 as an optical component making a contribution to the image formation by the liquid crystal panel 341. According to this configuration, since these constituents can effectively be cooled, the image projection can stably be performed, and further, the deterioration of the liquid crystal panels 341 and the polarization conversion element 325 and the deterioration of the projection image can be suppressed.

Modifications of First Embodiment

Figure 18:
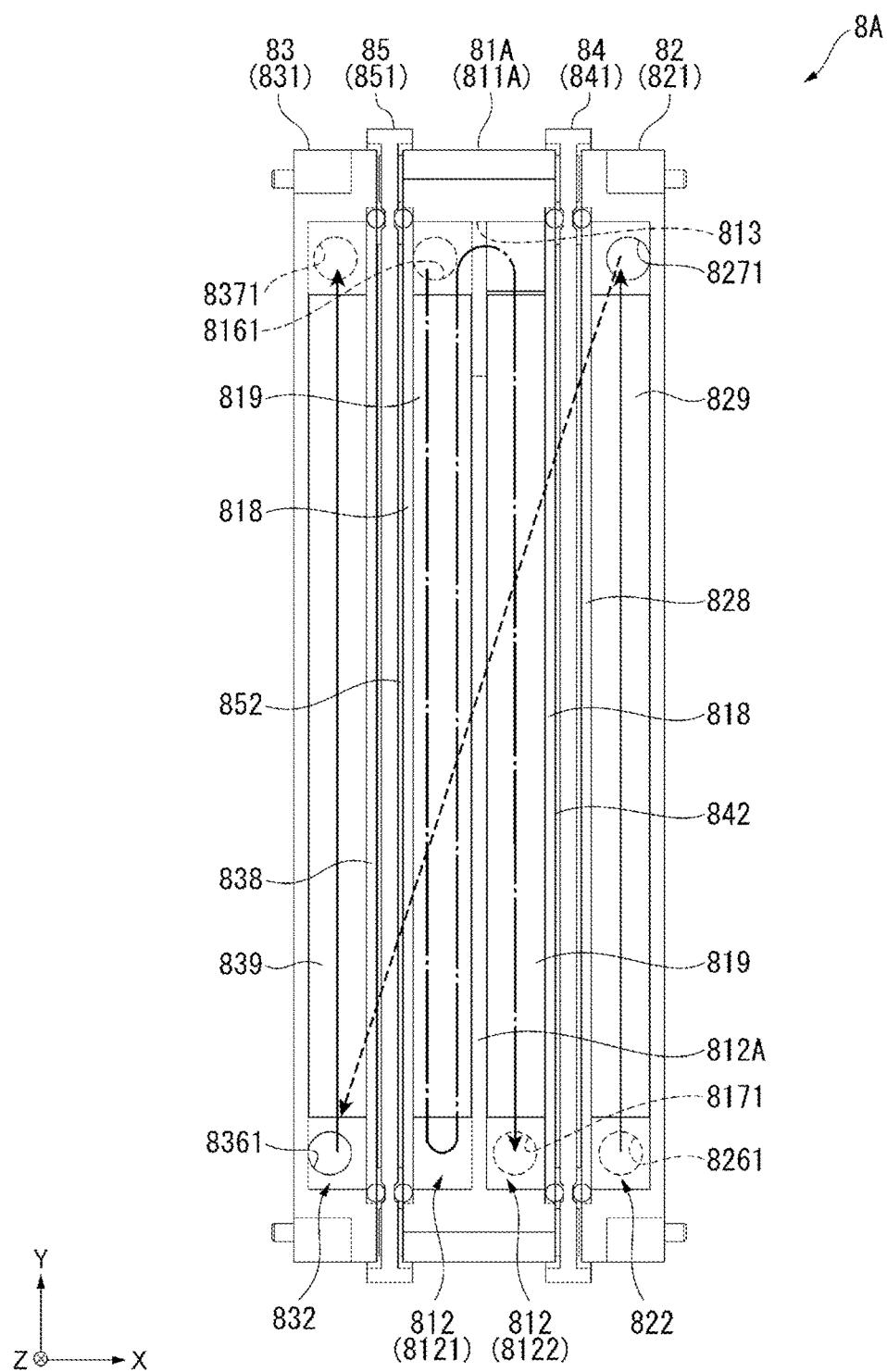
FIG. 18 is a cross-sectional view showing a modification of the heat exchange device in the first embodiment.

FIG. 18 is a cross-sectional view of a heat exchange device 8A as a modification of the heat exchange device 8 described above in the X-Y plane, and is a diagram showing the circulation directions of the first liquid and the second liquid in the heat exchange device 8A.

The heat exchange device 8A is provided with a similar configuration to the configuration of the heat exchange device 8 described above, but is different in the flow channel of the first liquid in an inner member 81A adopted instead of the inner member 81.

As shown in FIG. 18, the inner member 81A has substantially the same configuration as the configuration of the inner member 81 except the point that an inner housing 811A is provided instead of the inner housing 811 described above. The inner housing 811A has substantially the same configuration as the configuration of the inner housing 811 except the point that the inlet 8161 is disposed in the vicinity of the end portion on the Y-direction side of the front surface 811F, and the outlet 8171 is disposed in the vicinity of the end portion on the opposite side to the Y-direction side.

In such a heat exchange device 8A, the flow channels of the second liquid in the first outer member 82 and the second outer member 83 are the same as those of the heat exchange device 8. Specifically, the second liquid having flowed from the inlets 8261, 8361 into the recessed sections 822, 832 circulates toward the Y-direction side through the fine flow channels of the heat release members 829, 839 located in the recessed sections 822, 832, and is then discharged from the outlets 8271, 8371 to the outside, respectively, as indicated by the solid arrows in FIG. 18.

In contrast, in the inner member 81A, the first liquid having flowed from the inlet 8161 located on the Y-direction side into the first recessed section 8121 circulates toward the opposite side to the Y-direction side through the fine flow channels of the heat receiving member 819 in the first recessed section 8121. Then, the first liquid circulates between the inner surface on the opposite side to the Y-direction side of the first recessed section 8121 and the end portion on the opposite side to the Y-direction side of the heat receiving member 819, then circulates toward the Y-direction side through the fine flow channels of the heat receiving member 819, and then flows into the second recessed section 8122 through the communication opening 813.

The first liquid having flowed into the second recessed section 8122 circulates toward the opposite side to the Y-direction side through the fine flow channels of the heat receiving member 819 in the second recessed section 8122, and is then discharged to the outside from the outlet 8171 located on the opposite side to the Y-direction side in the front surface 811F.

According also to the projector 1 equipped with such a heat exchange device 8A, the same advantages as in the projector 1 equipped with the heat exchange device 8 described above can be exerted.

It should be noted that in the configuration of the heat exchange device 8A, the heat conduction efficiency by the thermoelectric conversion elements 842, 852 is higher than that of the heat exchange device 8. However, since there is adopted the configuration in which the first liquid is made to flow into the first recessed section 8121 from the Y-direction side, and further, the first liquid is circulated toward the opposite side to the Y-direction side in the second recessed section 8122, and is then discharged, there is a possibility that the first recessed section 8121 and the second recessed section 8122 fail to be filled with the first liquid. Therefore, in the case in which the heat exchange device 8A is adopted, it is necessary to adjust the flow rate of the first liquid.

Second Embodiment

Then, a second embodiment of the invention will be described.

The projector according to the present embodiment is provided with substantially the same configuration as that of the projector 1 described above, but is different therefrom in the configuration of the heat exchange device. Specifically, the heat exchange device adopted in the projector according to the present embodiment is provided with seal members surrounding the respective heat conduction devices. In this point, the projector according to the present embodiment and the projector 1 described above are different from each other. It should be noted that in the description below, a part which is the same or substantially the same as the part having already been described is denoted by the same reference symbol, and the description thereof will be omitted.

Figure 19:
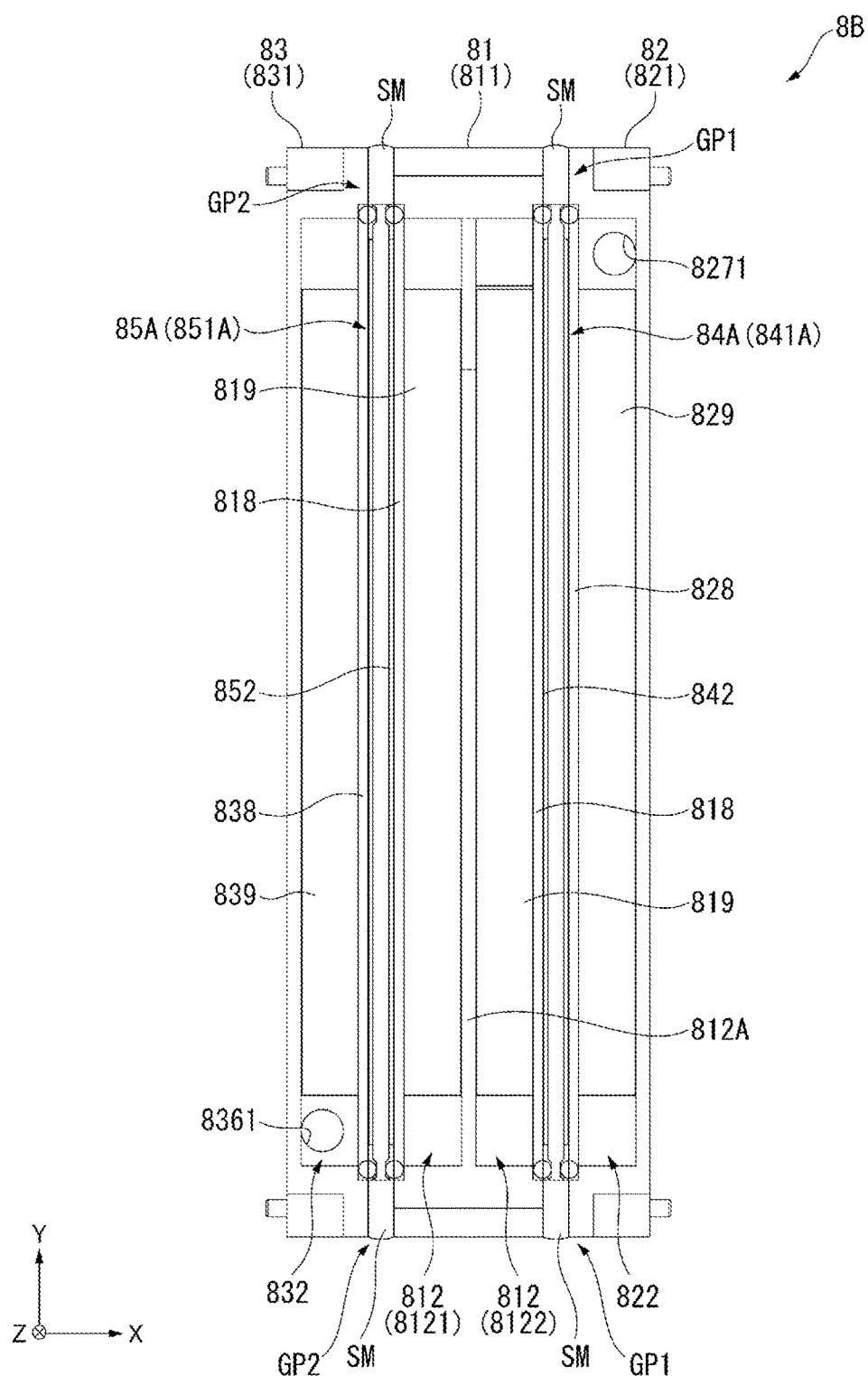
FIG. 19 is a cross-sectional view showing a heat exchange device provided to a projector according to a second embodiment of the invention.

FIG. 19 is a cross-sectional view of the heat exchange device 8B provided to the projector according to the present embodiment in the X-Y plane.

The projector according to the present embodiment has substantially the same configuration and the advantages as those of the projector 1 described above except the point that a heat exchange device 8B is provided instead of the heat exchange device 8 described above. Further, as shown in FIG. 19, the heat exchange device 8B has substantially the same configuration and the functions as those of the heat exchange device 8 except the point that heat conduction devices 84A, 85A are provided instead of the heat conduction devices 84, 85, and the seal members SM are further provided.

The heat conduction devices 84A, 85A have substantially the same configurations and functions as those of the heat conduction devices 84, 85 described above except the point that housings 841A, 852A are provided instead of the housings 841, 851.

The housings 841A, 851A are formed to be smaller in dimension along the Y direction than the housings 841, 851, respectively.

Further, in the heat exchange device 8B, there are formed gaps GP1 between the inner member 81 and the first outer member 82 on the Y-direction side and the opposite side to the Y-direction side of the heat conduction device 84A, and there are formed gaps GP2 between the inner member 81 and the second outer member 83 on the Y-direction side and the opposite side to the Y-direction side of the heat conduction device 85A. These gaps GP1, GP2 are infilled with the seal members SM. As such seal members SM, there can be cited a rubber ring and resin.

According to the projector related to the present embodiment described hereinabove, in addition to the advantages substantially the same as those of the projector 1 described above, the following advantages can be exerted.

By infilling the gaps GP1, GP2 with the seal members SM, the area of the heat conduction devices 84A, 85A exposed to the outside can be decreased. Therefore, the tightness of sealing of the thermoelectric conversion elements 842, 852 can be enhanced, and thus, the heat conduction efficiency can further be increased, and in addition, the dew condensation can be inhibited from occurring.

It should be noted that in the case in which the housings 841A, 851A are formed to be smaller in dimension along the Z direction than the housings 841, 851, respectively, and gaps can also occur on the Z-direction side and the opposite side to the Z-direction side, the gaps can also be infilled with the seal members SM.

Modifications of Embodiments

The invention is not limited to the embodiments described above, but includes modifications, improvements, and so on in the range where the advantages of the invention can be achieved.

In each of the embodiments described above, it is assumed that the space in the inner housing 811 of the inner member 81 is divided by the division wall 812A into the space S1 in the first recessed section 8121 and the space S2 in the second recessed section 8122, and the heat receiving members 819 supported by the two plate-like members 818 sandwiching the inner housing 811 are disposed in the respective spaces S1, S2. However, the invention is not limited to this configuration. Specifically, the division wall 812A can be eliminated. In this case, it is also possible to adopt a configuration in which the first liquid having flowed inside from the inlet 8161 circulates toward the Y-direction side through the fine flow channels of the heat receiving members 819, and is then discharged to the outside from the outlet 8171 located on the Y-direction side.

In each of the embodiments described above, it is assumed that between the inner member 81 and the first outer member 82, and between the inner member 81 and the second outer member 83, there are disposed the heat conduction devices 84, 85 having the thermoelectric conversion elements 842, 852, respectively. However, the invention is not limited to this configuration. For example, there can also be adopted a configuration in which either one or none of these heat conduction devices 84, 85 is provided. In the latter case, it is also possible to connect the inner member 81 and the outer members 82, 83 with other heat conduction members such as heat-conductive grease so as to be able to conduct the heat.

In each of the embodiments described above, the communication opening 813 is disposed at the position located on the Y-direction side and on the Z-direction side in the division wall 812A. However, the invention is not limited to this configuration. Specifically, the position of the communication opening 813 can be a different position.

Further, besides the configuration of communicating the space S1 and the space S2 with the communication opening 813, it is also possible to adopt a configuration of circulating the first liquid from the space S1 to the space S2 via a pipe disposed outside the inner member 81.

In each of the embodiments described above, it is assumed that the inlet 8161 and the outlet 8171 of the inner member 81 are located in the front surface 811F. However, the invention is not limited to this configuration. For example, the inlet 8161 and the outlet 8171 can be located in the back surface, or in respective surfaces different from each other. For example, it is possible to locate the inlet 8161 in the bottom surface of the inner housing 811, and the outlet 8171 in the top surface thereof. Further, although it is assumed that the inlet 8161 is located on the opposite side to the Y-direction side, and the outlet 8171 is located on the Y-direction side, the inlet 8161 and the outlet 8171 can be located in other regions.

The same also applies to the inlet 8261 and the outlet 8271 of the first outer member 82 and the inlet 8361 and the outlet 8371 of the second outer member 83.

In each of the embodiments described above, it is assumed that the outlet 8271 of the first outer member 82 and the inlet 8361 of the second outer member 83 are connected to each other so that the second liquid can circulate through the pipe P. However, the invention is not limited to this configuration. For example, it is possible to adopt a configuration in which the second liquid individually circulates in each of the first outer member 82 and the second outer member 83.

Further, it is also possible to assume that the member located on the upstream side in the flow of the second liquid is the second outer member 83, and the member located on the downstream side is the first outer member 82.

In each of the embodiments described above, it is assumed that the first liquid circulating in the heat absorbing device 6 and the second liquid circulating in the heat radiation device 7 flow into the heat exchange device 8, 8A, or 8B. However, the invention is not limited to this configuration. Specifically, the configuration of the cooling device in which the heat exchange device 8, 8A, or 8B is adopted can be a different configuration. In other words, the heat exchange device according to the invention can be applied to a cooling device with any configuration providing a cooling liquid to which the heat of a cooling object is conducted and another cooling liquid for cooling the cooling liquid circulate in the cooling device. For example, it is also possible to apply the heat exchange device according to the invention to a cooling device for directly feeding the first liquid to the heat absorber connected to the cooling object.

Further, the electronic apparatus in which the heat exchange device according to the invention, or the cooling device equipped with the heat exchange device is implemented is not limited to a projector, but can also be other electronic apparatuses, and the heat exchange device according to the invention, or the cooling device equipped with the heat exchange device can also be implemented in a vehicle.

In each of the embodiments described above, it is assumed that the circulatory cooling device 5 circulates the cooling air in the sealed space S to cool the cooling objects disposed in the sealed space S. However, the invention is not limited to this configuration. For example, it is also possible to fill the sealed space S with a gas (e.g., a nitrogen gas or a helium gas) other than the air, and cool the cooling objects by circulating the gas.

In each of the embodiments described above, the polarization conversion element 325 and the electro-optic device 34 are cited as the cooling objects. However, the invention is not limited to this configuration. For example, it is also possible to adopt either one of the polarization conversion element 325 and the electro-optic device 34 as the cooling object. Further, as the cooling object, it is also possible to adopt a light source device, or other optical components.

Further, in each of the embodiments described above, the electro-optic device 34 is disposed on the upstream side near to the heat absorber 61 in the circulation flow channel of the cooling air, and the polarization conversion element 325 is disposed on the downstream side. However, besides this configuration, the electro-optic device 34 and the polarization conversion element 325 can be disposed in reverse order in the circulation flow channel, or can be disposed in parallel to each other. The same applies to the case in which other cooling objects are adopted.

In each of the embodiments described above, it is assumed that the projector 1 is equipped with the three liquid crystal panels 341 (341R, 341G, and 341B). However, the invention is not limited to this configuration. Specifically, the invention can also be applied to a projector using two or less liquid crystal panels, or four or more liquid crystal panels.

Further, the shape of the image forming device 3 is not limited to the shape described above, but it is possible to adopt a configuration having a roughly L planar shape or roughly U planar shape, or other configurations.

Further, the liquid crystal panels 341 adopted as the light modulation device can be a transmissive type or a reflective type, or it is also possible to use a light modulation device other than the liquid crystal, such as a device using a micromirror, for example, using a digital micromirror device (DMD).

In each of the embodiments described above, it is assumed that the illumination device 31 has the configuration provided with the two light source devices 31A, 31B each having the light source lamp 311 and the reflector 312. However, the invention is not limited to this configuration. Specifically, the number of the light source devices can be one, three, or more. Further, the light source device can have a configuration having a solid-state light source such as alight emitting diode (LED) or a laser diode (LD). In this case, it is also possible to adopt a configuration having a phosphor excited by excitation light emitted from an LD to emit fluorescence.

CROSS REFERENCE TO RELATED APPLICATIONS

This application claims priority to Japanese Patent Application No. 2015-079499 filed on Apr. 8, 2015, the entire contents of which are incorporated by reference herein.

What is claimed is:
1. A heat exchange device comprising:
an inner member through which a first liquid circulates; and
a pair of outer members through which a second liquid different from the first liquid circulates,
wherein the inner member is provided with
an inner housing through which the first liquid circulates, and
a pair of first plate-like members attached to the inner housing so as to be opposed to each other,
each of the pair of outer members is provided with
an outer housing through which the second liquid circulates, and
a second plate-like member attached to the outer housing, and
the pair of outer members are disposed at positions across the inner member from each other so that one of the pair of first plate-like members is opposed to one of the second plate-like members of the pair of outer members, and the other of the pair of first plate-like members is opposed to the other of the second plate-like members.
2. The heat exchange device according to claim 1, wherein
each of the pair of first plate-like members is provided with a heat receiving member disposed in the inner housing, and adapted to receive heat from the first liquid,
each of the second plate-like members is provided with a heat release member disposed in the outer housing, and adapted to release conducted heat to the second liquid,
the one of the pair of first plate-like members and the one of the second plate-like members are connected to each other so as to be able to conduct the heat, and
the other of the pair of first plate-like members and the other of the second plate-like members are connected to each other so as to be able to conduct the heat.
3. A cooling device comprising:
the heat exchange device according to claim 2;
a heat absorbing device adapted to absorb heat generated in a cooling object to conduct the heat to the first liquid; and
a heat radiation device adapted to radiate heat of the second liquid to which the heat is conducted from the first liquid in the heat exchange device.
4. The heat exchange device according to claim 1, wherein
the inner housing has a division wall adapted to divide an inner space of the inner housing into a first space as a space of one of the pair of first plate-like members, and a second space as a space of the other of the pair of first plate-like members, and
the first liquid having circulated in the first space is made to flow into the second space.
5. The heat exchange device according to claim 4, wherein
the division wall has a communication opening adapted to communicate the first space and the second space with each other.

6. The heat exchange device according to claim 5, wherein
the division wall is formed along a vertical direction, and
the communication opening is located in a vicinity of an end portion on an upper side in the vertical direction in the division wall.

7. The heat exchange device according to claim 6, wherein among the pair of first plate-like members,
the first plate-like member located on a first space side is connected to the second plate-like member of the outer member located on a downstream side in a flow channel of the second liquid out of the two outer members so as to be able to conduct the heat, and
the first plate-like member located on a second space side is connected to the second plate-like member of the outer member located on an upstream side in the flow channel of the second liquid out of the two outer members so as to be able to conduct the heat.

8. A cooling device comprising:
the heat exchange device according to claim 4;
a heat absorbing device adapted to absorb heat generated in a cooling object to conduct the heat to the first liquid; and
a heat radiation device adapted to radiate heat of the second liquid to which the heat is conducted from the first liquid in the heat exchange device.

9. The heat exchange device according to claim 1, wherein
the inner housing is provided with
an inner-housing-side inlet through which the first liquid flows into the inner housing, and
an inner-housing-side outlet through which the first liquid located inside the inner housing flows to an outside, and
the inner-housing-side inlet and the inner-housing-side outlet are located in a surface on a same side of the inner housing.

10. The heat exchange device according to claim 9, wherein
the inner-housing-side inlet is located on a lower side in a vertical direction, and
the inner-housing-side outlet is located on an upper side in the vertical direction.

11. A cooling device comprising:
the heat exchange device according to claim 9;
a heat absorbing device adapted to absorb heat generated in a cooling object to conduct the heat to the first liquid; and
a heat radiation device adapted to radiate heat of the second liquid to which the heat is conducted from the first liquid in the heat exchange device.

12. The heat exchange device according to claim 1, wherein
each of the outer housings is provided with
an outer-housing-side inlet through which the second liquid flows into the outer housing, and
an outer-housing-side outlet through which the second liquid located inside the outer housing flows to an outside, and
the outer-housing-side outlet provided to the one of the two outer members and the outer-housing-side inlet provided to the other of the two outer members are connected to each other so that the second liquid can circulate.

13. The heat exchange device according to claim 12, wherein
the outer-housing-side outlet provided to the one of the outer members and the outer-housing-side inlet provided to the other of the outer members are located in surfaces facing to the same side,
the outer-housing-side inlet provided to the one of the outer members and the outer-housing-side outlet provided to the other of the outer members are located in surfaces facing to the same side,
the outer-housing-side inlet provided to each of the two outer members is located on a lower side in a vertical direction, and
the outer-housing-side outlet provided to each of the two outer members is located on an upper side in the vertical direction.

14. A cooling device comprising:
the heat exchange device according to claim 12;
a heat absorbing device adapted to absorb heat generated in a cooling object to conduct the heat to the first liquid; and
a heat radiation device adapted to radiate heat of the second liquid to which the heat is conducted from the first liquid in the heat exchange device.

15. The heat exchange device according to claim 1, further comprising:
a thermoelectric conversion element disposed in at least one of a position between the one of the first plate-like members and the one of the second plate-like members and a position between the other of the first plate-like members and the other of the second plate-like members, wherein a heat absorbing side of the thermoelectric conversion element faces to the first plate-like member, and a heat release side of the thermoelectric conversion element faces to the second plate-like member.

16. A cooling device comprising:
the heat exchange device according to claim 15;
a heat absorbing device adapted to absorb heat generated in a cooling object to conduct the heat to the first liquid; and
a heat radiation device adapted to radiate heat of the second liquid to which the heat is conducted from the first liquid in the heat exchange device.

17. A cooling device comprising:
the heat exchange device according to claim 1;
a heat absorbing device adapted to absorb heat generated in a cooling object to conduct the heat to the first liquid; and
a heat radiation device adapted to radiate heat of the second liquid to which the heat is conducted from the first liquid in the heat exchange device.

18. The cooling device according to claim 17, wherein
the heat absorbing device includes
a heat absorber adapted to absorb the heat of the cooling object and then conduct the heat to the first liquid circulating through the heat absorber, and
a first liquid pressure-feed section adapted to pressure-feed the first liquid, and the heat radiation device includes
a second liquid pressure-feed section adapted to pressure-feed the second liquid, and
a heat radiator adapted to radiate the heat conducted from the second liquid circulating through the heat radiator.

19. A projector comprising:
the cooling device according to claim 18.

20. The projector according to claim 19, comprising:
a light source;

a light modulation device adapted to modulate light emitted from the light source to form an image;

an optical component making a contribution to the formation of the image by the light modulation device; and a circulatory cooling device having a sealed housing incorporating the cooling object, and adapted to circulate a gas in the sealed housing to cool the cooling object, wherein the cooling object is at least either of the light source, the light modulation device, and the optical component.

21. The heat exchange device according to claim 1, wherein:

the one of the second plate-like members is provided between one of the outer housings and the one of the pair of first plate-like members; and the other of the second plate-like members is provided between the other of the outer housings and the other of the pair of first plate-like members.

\* \* \* \* \*